United States Patent [19]
Sandberg et al.

[11] Patent Number: 5,810,149
[45] Date of Patent: Sep. 22, 1998

[54] CONVEYOR SYSTEM

[75] Inventors: Glenn A. Sandberg, Lockport; Scott A. Lindee, Mokena, both of Ill.

[73] Assignee: Formax, Inc., Mokena, Ill.

[21] Appl. No.: 753,481

[22] Filed: Nov. 26, 1996

[51] Int. Cl.[6] ................................................ B65G 37/00
[52] U.S. Cl. ........................................ 198/369.2; 198/436
[58] Field of Search ............................. 198/369.1, 369.2, 198/435, 436, 456, 457, 448

[56] References Cited

U.S. PATENT DOCUMENTS

| | | | |
|---|---|---|---|
| 3,647,044 | 3/1972 | Orstam | 198/436 |
| 4,166,525 | 9/1979 | Bruno | 198/369.2 X |
| 4,281,757 | 8/1981 | Moston | 198/369.2 X |
| 4,846,336 | 7/1989 | Hoyland et al. | 198/436 X |

*Primary Examiner*—James R. Bidwell
*Attorney, Agent, or Firm*—McAndrews, Held & Malloy, Ltd.

[57] ABSTRACT

A conveyor system for accepting one or more streams of product input and converting the one or more streams to a format that is suitable for automatic loading to a subsequent machine is disclosed. The conveyor system comprises an input level shifting conveyor disposed to receive the one or more product input streams. The level shifting conveyor is movable between a first upper level position and second lower level position. An upper level strip conveyor is disposed to receive product from the input level shifting conveyor when the input level shifting conveyor is moved to the first upper level position. The upper level strip conveyor includes an output end that is in a fixed position to direct product received by the upper level strip conveyor to a first lateral alignment position of the format. A lower level strip conveyor is disposed to receive product from the level shifting conveyor when the level shifting conveyor is moved to the second lower level position. The lower level strip conveyor includes an output end that is in a fixed position to direct product received by the lower level strip conveyor to a second lateral alignment position of the format. The second lateral alignment position is different from the first lateral alignment position. An output level shifting conveyor is also used. The output level shifting conveyor is movable between a first upper level position at which it is disposed to receive product from the upper level strip conveyor and a second lower level at which it is disposed to receive product from the lower level strip conveyor.

36 Claims, 19 Drawing Sheets

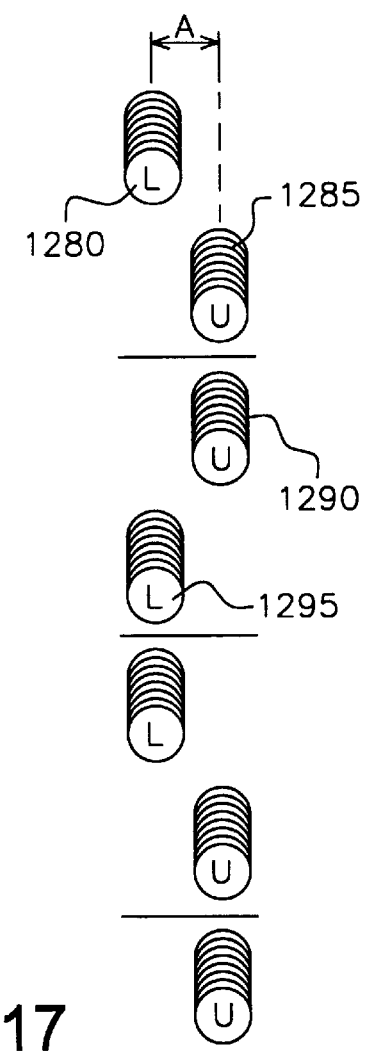
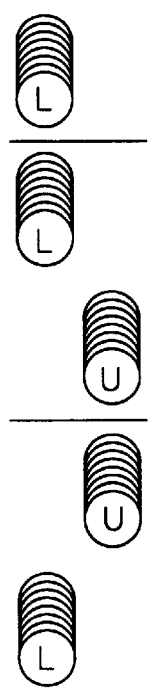
Fig. 17
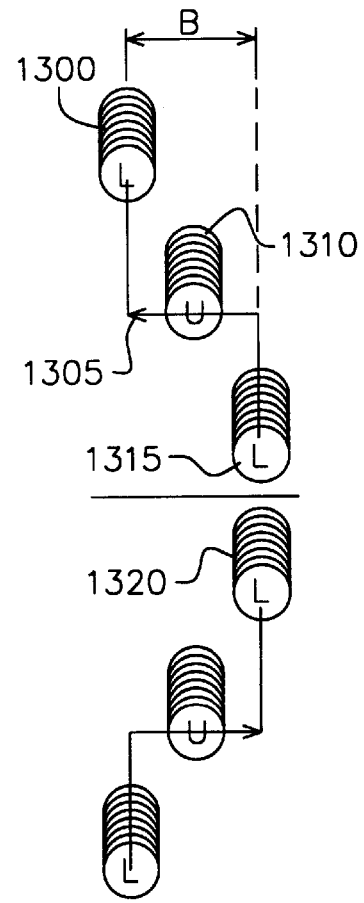
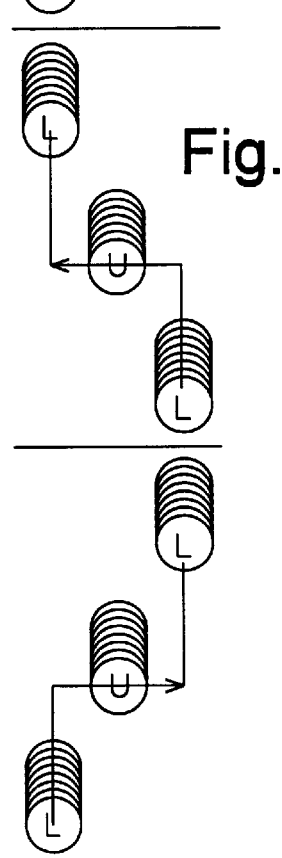
Fig. 18

CONVEYOR SYSTEM

BACKGROUND OF THE INVENTION

The present invention relates to a conveyor system. More particularly, the present invention relates to a conveyor system for use in accepting one or more product streams and formatting the product to match the format required at the input of a packaging machine.

Conveyor systems are used for a wide range of purposes. One such purpose is the formatting of one or more streams of product so that, for example, the product spacing corresponds to the spacing needed for a subsequent operation. Such conveyor systems are used, for example, to convert one or two output streams of stacked or shingled meat from a slicing machine into the format required by a packaging machine. Depending on the required format, the conveyor must combine two or more separate streams into a single output stream or multiply the streams into a larger number of output streams. Additionally, the conveyor must properly space the product along both the length and the width of the conveyor to ensure compatibility with the packaging machine.

Conventional conveyor systems for changing the number of streams of product usually include a simple flat belt conveyor and a series of fixed curbs or built conveyors which guide the products in the lateral direction of the belt conveyor to merge two streams into one or to multiply the number of streams. Examples of these conventional conveying systems are described in FR-A-2587007 and FR-A-2168967.

Conventional systems that have been provided specifically for handling meat products include U.S. Pat. No. 4,431,104 in which three successive products from a stream coming from one direction are fed to a turning table on which the direction of conveyance of the products is turned through 90 degrees, so that, at the output of the turning table, the three successive products form three separate streams of product on an output conveyor. Another conveyor system specifically intended to handle slices of meat product is shown in GB-A-1546126 in which a single stream of product is fed via an overhead conveyor and placed on top of pieces of card fed along a second conveyor underneath the overhead conveyor with means being provided to synchronize the travel of the product and the card so that the product is deposited on the card.

Another conveyor system specifically adapted for formatting meat products is shown in U.S. Pat. No. 4,846,336. The '336 patent is purportedly directed to a conveyor system for positioning slices of meat by converting M input streams of product into N output streams of products where M is an integer greater than one and N is an integer not equal to M. The system includes an input conveyor for conveying M input streams and an output conveyor for conveying N output streams. It also includes a multi-element strip conveyor having its upstream input end arranged to receive products from an input stream and having its downstream end arranged to continuously move laterally throughout the formatting process to deposit products from the input stream to form an output stream shifted laterally with respect to the input stream.

The present inventors have recognized that the foregoing conveyor system may experience significant limitations in high-speed operation. Such high-speed operation is becoming increasingly necessary in view of the high-speed meat slicing and packaging systems that are available.

BRIEF SUMMARY OF THE INVENTION

A conveyor system for accepting one or more streams of product input and converting the one or more streams to a format that is suitable for automatic loading to a subsequent machine is disclosed. The conveyor system comprises an input level shifting conveyor disposed to receive the one or more product input streams. The level shifting conveyor is movable between a first upper level position and second lower level position. An upper level strip conveyor is disposed to receive product from the input level shifting conveyor when the a input level shifting conveyor is moved to the first upper level position. The upper level strip conveyor includes an output end that is in a fixed position during formatting to direct product received by the upper level strip conveyor to a first lateral alignment position of the format. A lower level strip conveyor is disposed to receive product from the level shifting conveyor when the level shifting conveyor is moved to the second lower level position. The lower level strip conveyor includes an output end that is in a fixed position during formatting to direct product received by the lower level strip conveyor to a second lateral alignment position of the format. The second lateral alignment position is different from the first lateral alignment position. An output level shifting conveyor is also used. The output level shifting conveyor is movable between a first upper level position at which it is disposed to receive product from the upper level strip conveyor and a second lower level at which it is disposed to receive product from the lower level strip conveyor.

In accordance with various advantageous embodiments of the conveyor system, the input level shifting conveyor comprises at least two adjacent hinged conveyors pivotable about a common axis and independently operable to direct product to the upper and lower level strip conveyors. The lower level strip conveyor likewise comprises at least two output ends disposed laterally from one another and respectively associated with each of the at least two hinged conveyors. The output level shifting conveyor of such an embodiment may comprise a plurality of hinged conveyors that are pivotably movable about a common axis. Each hinged conveyor is respectively associated with each of the at least two output ends of the lower level strip conveyor.

BRIEF DESCRIPTION OF THE SEVERAL VIEWS OF THE DRAWINGS

FIGS. 17–22 illustrate several ways in which the conveyor system of FIG. 1 can be operated to provide different product formats with different product input streams.

DETAILED DESCRIPTION OF THE INVENTION

Figure 1:
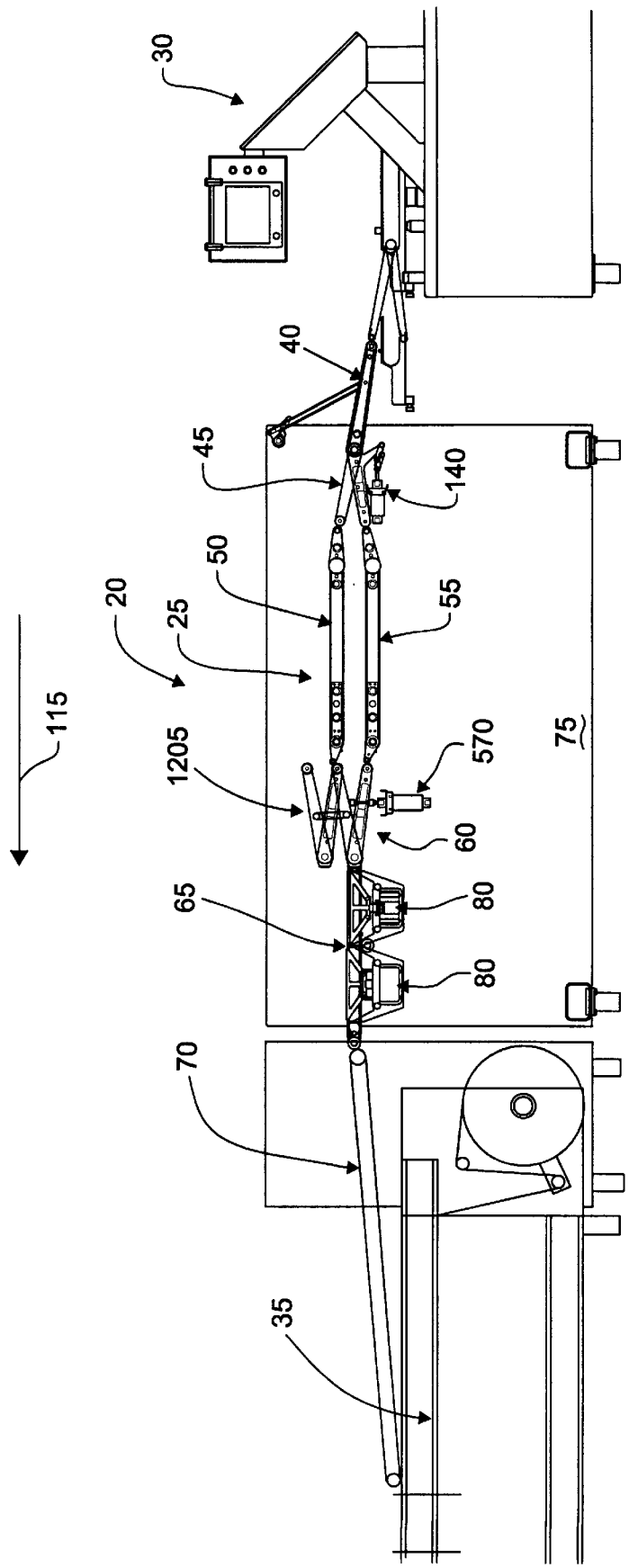
FIG. 1 is a side view of a slicing/conveying/packaging system incorporating a conveying system, shown here in cross-section, that is constructed in accordance with one embodiment of the present invention.

FIG. 1 illustrates a slicing/conveying/packaging system, shown generally at 20 which utilizes a conveyor system, shown generally at 25, constructed in accordance with one embodiment of the present invention. As shown, the system 20 comprises a slicing machine 30, the conveyor system 25, and a packaging machine 35. The slicing machine 30 may be, for example, a high-speed slicing machine such as an S-180™ available from Formax™, Inc., of Mokena, Ill. The packaging machine 35 may be, for example, a Tiromat 3000™ available from Tiromat. Although the preferred embodiment is described herein in a system including the packaging machine 35 and the slicing machine 30, it will be recognized that the conveyor system 25 can be used in connection with other types of product supplies and product outputs.

The conveyor system 25 accepts one or more streams of product from the slicing machine 30 and arranges the products in the proper format for acceptance by the packaging machine 35. Different packages require different product formats at the packaging machine input. In the illustrated embodiment, the formats correspond to the lateral and longitudinal spacing of the packages that are filled with the product during a single index cycle of the packaging machine 35.

To achieve the proper product format, the conveyor system 25 utilizes a plurality of unique conveyor sections that cooperate with one another to provide a wide range of different product formats with the same basic conveyor system construction. In the illustrated embodiment of the conveyor system 25, the unique conveyor sections comprise an input conveyor 40, an input level-shifting conveyor 45, an upper strip conveyor 50, a lower strip conveyor 55, an output level-shifting conveyor 60, a row staging conveyor 65, and an output conveyor 70. The conveyors are driven by a plurality of motors and actuators under the control of, for example, a programmable logic controller (PLC) or microcontroller based system. The motors, actuators, and control electronics are preferably disposed within a main housing 75. More preferably, the main housing 75 is separated into upper and lower regions by a dividing wall which separates and protects the control electronics from the motors, etc.

In operation, the input conveyor 40 receives one or more streams of sliced meat (stacked or shingled) from the slicing machine 30 and transfers the one or more streams to the input level-shifting conveyor 45. The input level shifting conveyor 45 is disposed to receive the one or more product streams, in this embodiment, from the input conveyor 40 and is operable to selectively and independently move the one or more product input streams between an upper level position proximate the upper level strip conveyor 50 and a lower level position proximate the lower level strip conveyor 55. The upper level strip conveyor 50 accepts product from the product stream(s) when the input level shifting conveyor 45 is in its upper level position while the lower level strip conveyor 55 accepts product from the product stream(s) when the input level shifting conveyor 45 is in its lower level position. Each strip conveyor 50 and 55 conveys the product that it receives from the input level shifting conveyor 45 and aligns the product to its proper lateral spacing for the desired product format.

The output level shifting conveyor 60 accepts product at the proper lateral spacing from either the upper level strip conveyor 50 or the lower level strip conveyor 55. To this end, the output level shifting conveyor 60 is selectively movable between an upper level position at which it receives product from the upper level strip conveyor 50 and a lower level position at which it receives product from the lower level strip conveyor 55. The product received from either the upper level strip conveyor 50 or the lower level strip conveyor 55 is output to a subsequent, single level conveyor, shown here as the row staging conveyor 65.

Further strip conveyor levels may also be employed. If such further levels are employed, the input and output level shifting conveyors 45 and 60 would have to be modified accordingly to shift between all of the strip conveyors that are utilized.

The row staging conveyor 65 illustrated in the present embodiment comprises at least one set of stop members 80 that engage the product received from the output level shifting conveyor 60 to align the product in one or more rows. In the illustrated embodiment, the row staging conveyor 60 includes two rows of stop members 80, each row being aligned laterally across at least a portion of the width of the row staging conveyor 65.

Level Shifting and Lateral Spacing System

Figure 2:
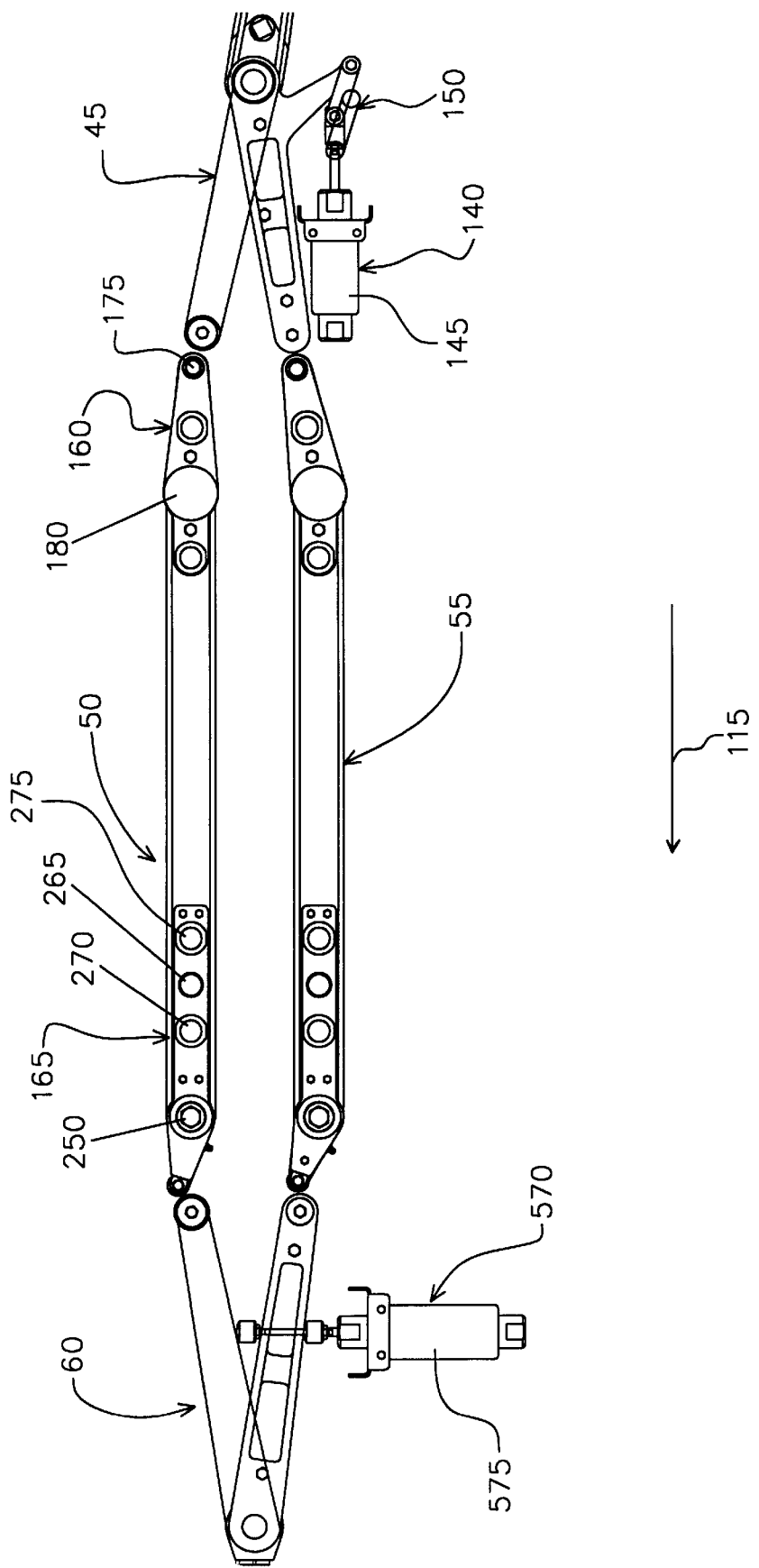
FIG. 2 is a side cross-sectional view of the level shifting conveyors and the strip conveyors of the embodiment of FIG. 1.
Figure 3:
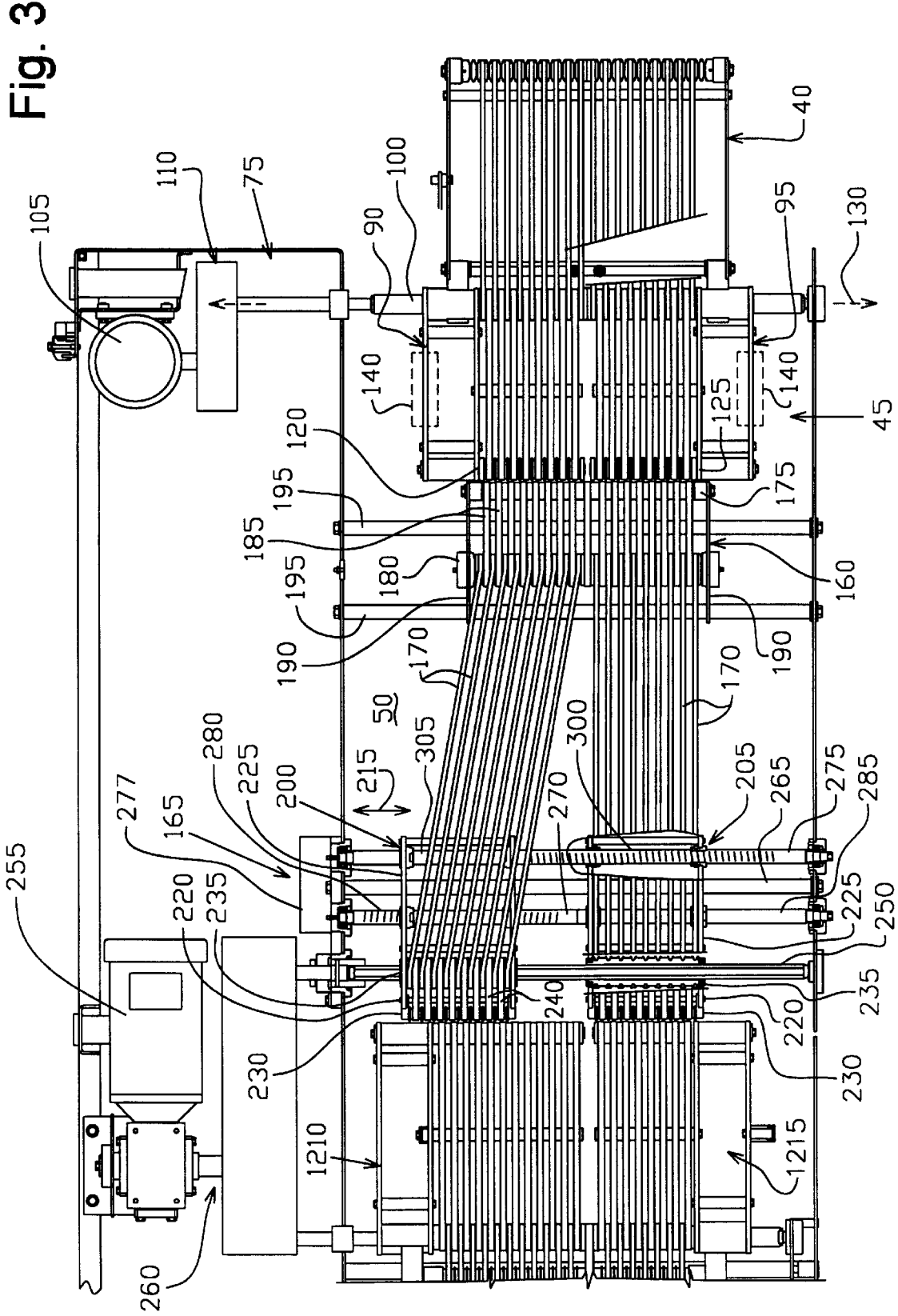
FIG. 3 is a top view of the level shifting conveyors and the upper level strip conveyors with certain sections in cross-sectional view.
Figure 4:
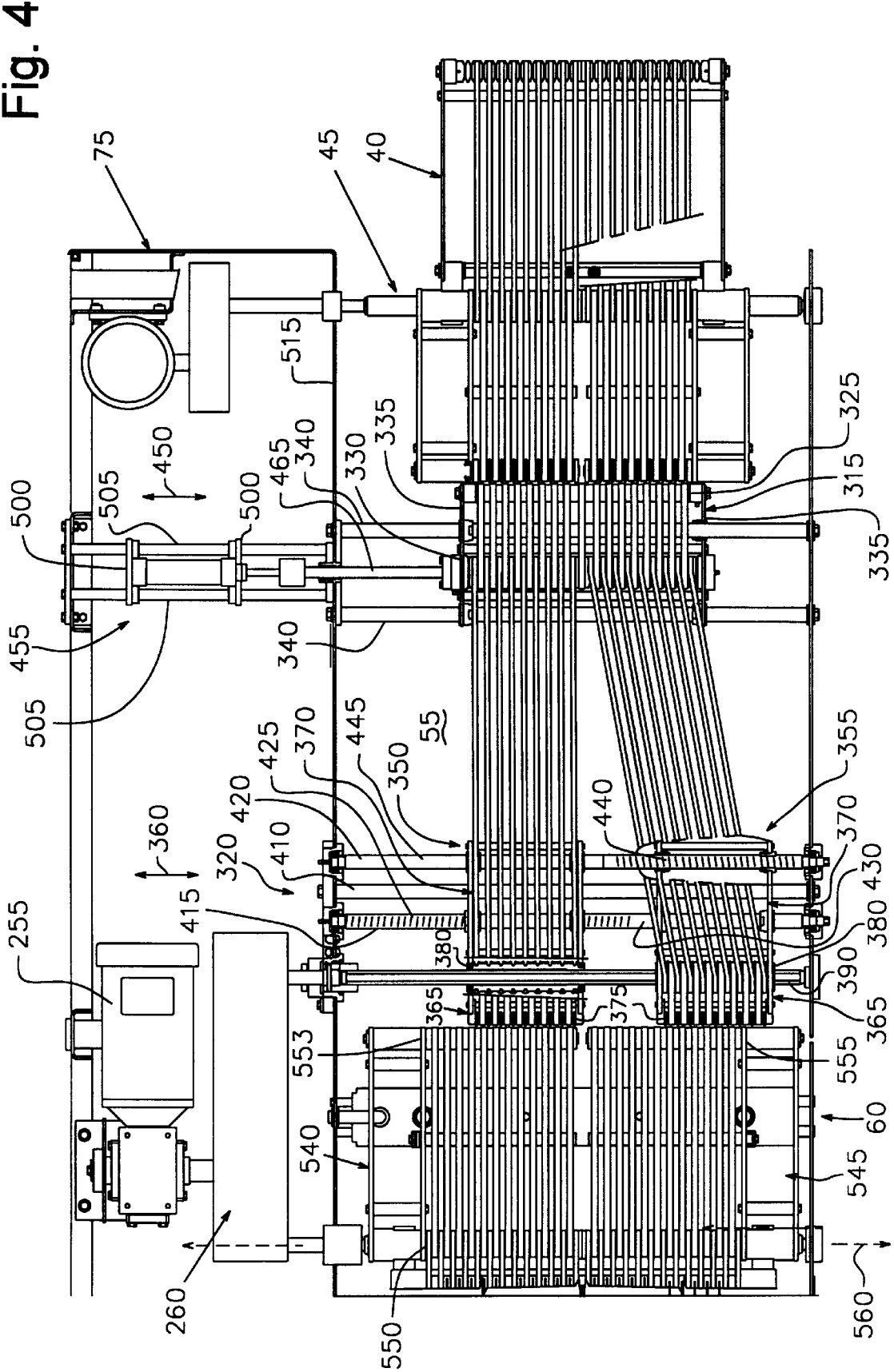
FIG. 4 is a top view of the level shifting conveyors and the lower level a strip conveyors with certain sections in cross-sectional view.

FIGS. 2–4 illustrate one embodiment of the input and output level shifting conveyors 45 and 60 and the upper and lower level strip conveyors 50 and 55. The particular embodiment shown here is designed to receive, at most, two streams of product and place the received product onto a subsequent conveyor with the proper lateral spacing for the desired format. However, it will be recognized that additional streams of product may be accommodated by merely adding further parallel sections to the sections described below.

To accommodate the dual streams of product from the slicing machine 30, the input level shifting conveyor 45 comprises adjacent level shifting conveyor sections 90 and 95 respectively associated with each of the product streams. The conveyor sections 90 and 95 are attached at the input end to a common drive roller 100 which, for example, is driven by a continuous motor 105 (although it will be recognized that a servo motor may be used) through an appropriate linkage 110. The continuous motor 105 is used in the illustrated embodiment to drive both the input conveyor section 40 and the input level shifting conveyor 45 and has its speed coordinated to the speed necessary to optimally receive the product streams from the slicing machine 30. The speed of the various conveyor sections of the conveyor system 25 generally decreases in the direction of arrow 115.

The level shifting conveyor sections 90 and 95 are cantilevered structures that include respective idle rollers 120 and 125 proximate the output. The cantilevered structures of the sections 90 and 95 are designed to be independently pivoted about an axis 130 defined by the drive roller 100 so that the respective output end of each of the sections 90 and 95 can be moved between an upper position at which the output end of the respective section is proximate the upper level strip conveyor 50 and a lower position at which the output end of the respective section is proximate the lower level strip conveyor 55. Each level shifting conveyor section 90 and 95 is accordingly associated with a respective pivot motion drive 140. Each of the pivot motion drives 140 shown here comprises a linear actuator 145, such as a pneumatic piston drive, which is attached to the respective level shifting conveyor section 90 and 95 through a corresponding linkage 150. Other drive mechanisms and level shifting motions are likewise suitable, though less optimal.

With specific reference to FIG. 3, there is shown one embodiment of the upper level strip conveyor 50. As illustrated, the upper level strip conveyor 50 comprises an input carriage section 160 and an output carriage section 165. A plurality of elastic conveyor bands 170 extend between the input and output carriage sections 160 and 165. The input carriage section 160 comprises two idle rollers 175 and 180 with a plurality of conveyor bands 185 extending therebetween. Longitudinal mounting brackets 190 join the rollers 175 and 180 and the conveyor bands 185 to a pair of laterally extending supports 195 which, in turn, are joined to the frame of the conveyor system 25.

The output carriage section 165 is comprised of two output carriage assemblies 200 and 205 that are independently adjustable in the direction of arrow 215 to thereby place the product received from the input level shifting conveyor 45 at the proper lateral position. Each output carriage assembly 200, 205 includes an output section 220 and an adjustment section 225. The output section 220 is comprised of an idle roller 230 and a drive roller 235 with a plurality of conveyor bands 240 extending therebetween. The drive rollers 235 of each of the output carriage assemblies 200 and 205 are disposed on a common drive shaft 250 that preferably has a polygonal cross-section and, even more preferably, a hexagonal cross-section. With such a construction, the output carriage assemblies 200 and 205 can move freely in the lateral direction while being secured for rotational movement with the drive shaft 250. As shown, the drive shaft 250 is driven by a continuous motor 255 through an appropriate linkage 260. Preferably, the common drive shaft 250 is mounted so as to be removable laterally from the system thereby facilitating cleaning.

Lateral adjustment of each of the output carriage assemblies 200 and 205 is accomplished through the engagement of the respective adjustment section 225 with a laterally extending adjustment support. The laterally extending adjustment support is comprised of a position indicator rod 265, a first adjustment rod 270 and a second adjustment rod 275. The first adjustment rod 270 includes a threaded portion 280 that engages a corresponding threaded portion of the adjustment section 225 of the output carriage assembly 200 and a non-threaded portion 285 that supports the adjustment section 225 of the output carriage assembly 205. Together, the first adjustment rod 270 and the corresponding threaded portion of the adjustment section 225 constitute a screw-drive which drives the output carriage assembly 200 back and forth in the lateral direction depending on which direction the adjustment rod 270 is rotated. Similarly, the second adjustment rod 275 includes a threaded portion 300 that engages a corresponding threaded portion of the adjustment section 225 of the output carriage assembly 205 and a non-threaded portion 305 that supports the adjustment section 225 of the output carriage assembly 200. Together, the second adjustment rod 275 and the corresponding threaded portion of the adjustment section 225 constitute a screw-drive which drives the output carriage assembly 205 back and forth in the lateral direction depending on which direction the adjustment rod 275 is rotated. The position indicator rod 265 includes a plurality of graduation marks disposed thereacross to provide an indication of the lateral position of the output carriage assemblies 200 and 205.

Lateral adjustment of the output carriage assemblies 200 and 205 proceeds by rotating the appropriate adjustment rod 270 and 275. For example, if the lateral position of the output carriage assembly 200 is to be adjusted, the adjustment rod 270 is rotated, either manually or, for example, through an automatic drive 277, until the carriage assembly 200 is properly positioned to align the product at the lateral position required for the desired product format.

With reference to FIG. 4, there is shown one embodiment of the lower level strip conveyor 55. As illustrated, the lower level strip conveyor 55 comprises an input carriage section 315 and an output carriage section 320. A plurality of elastic conveyor bands extend between the input and output carriage sections 315 and 320. The input carriage section 315 comprises two idle rollers 325 and 330 with a plurality of conveyor bands extending therebetween. Longitudinal mounting brackets 335 join the rollers 325 and 330 and the conveyor bands to a pair of laterally extending supports 340 which, in turn, are joined to the frame of the conveyor system 25.

The output carriage section 320 is comprised of two output carriage assemblies 350 and 355 that are independently adjustable in the direction of arrow 360 to thereby place the product received from the input level shifting conveyor 45 at the proper lateral position. Each output carriage assembly 350 and 355 includes an output section 365 and an adjustment section 370. The output section 365 of each output carriage assembly 350, 355 is comprised of an idle roller 375 and a drive roller 380 with a plurality of conveyor bands extending therebetween. The drive roller 380 of each of the output carriage assemblies 350 and 355 are disposed on a common drive shaft 390. Since the output carriage assemblies 350 and 355 are laterally adjustable, the drive shaft 390 has a polygonal cross-section, preferably a hexagonal cross-section. With such a construction, the output carriage assemblies 350 and 355 can move freely in the lateral direction while being secured for rotational movement with the drive shaft 390. As shown, the drive shaft 390 is driven by a continuous motor 255 through an appropriate linkage 260. Preferably, the common drive shaft 390 is mounted so as to be removable laterally from the system thereby facilitating cleaning.

Lateral adjustment of each of the output carriage assemblies 350 and 355 is accomplished through the engagement of the respective adjustment section 370 with a laterally extending adjustment support assembly. The laterally extending adjustment support assembly is comprised of a position indicator rod 410, a first adjustment rod 415, and a second adjustment rod 420. The first adjustment rod 415 includes a threaded portion 425 that engages a corresponding threaded portion of the adjustment section 370 of the output carriage assembly 350 and a non-threaded portion 430 that supports the adjustment section 370 of the output carriage assembly 355. Together, the first adjustment rod 415 and the corresponding threaded portion of the adjustment section 370 constitute a screw-drive which drives the output carriage assembly 350 back and forth in the lateral direction depending on which direction the adjustment rod 415 is rotated. Similarly, the second adjustment rod 420 includes a threaded portion 440 that engages a corresponding threaded portion of the adjustment section 370 of the output carriage assembly 355 and a non-threaded portion 445 that supports the adjustment section 370 of the output carriage assembly 350. Together, the second adjustment rod 420 and the corresponding threaded portion of the adjustment section 370 of the output carriage assembly 355 constitute a screw-drive which drives the output carriage assembly 355 back and forth in the lateral direction depending on which direction the adjustment rod 420 is rotated. The position indicator rod 265 includes a plurality of graduation marks disposed thereacross to provide an indication of the lateral position of the output carriage assemblies 200 and 205. The lateral adjustment may be accomplished in the same manner as described above in connection with the upper level strip conveyor, either manually or through an appropriate automatic drive.

With reference to FIG. 4, the input carriage section 315 of the lower strip conveyor 55 may be laterally adjusted in the direction of arrow 450. To this end, a lateral drive 455 is provided. The lateral drive 455 includes a shaft 465 extending therefrom that engages the longitudinal mounting brackets 335 of the input carriage section 315, preferably at the position of idle roller 330. The longitudinal mounting brackets 335 slidingly engage the lateral supports 340 to facilitate the desired lateral movement. The engagement between the longitudinal mounting brackets 335 and the lateral supports 340 may be constructed in any number of ways to facilitate such movement while reducing friction between the engagement surfaces. Although the lateral drive 455 is shown only in connection with the lower strip conveyor 55, it will be readily recognized that the upper strip conveyor 50 may likewise be similarly equipped.

Figure 5:
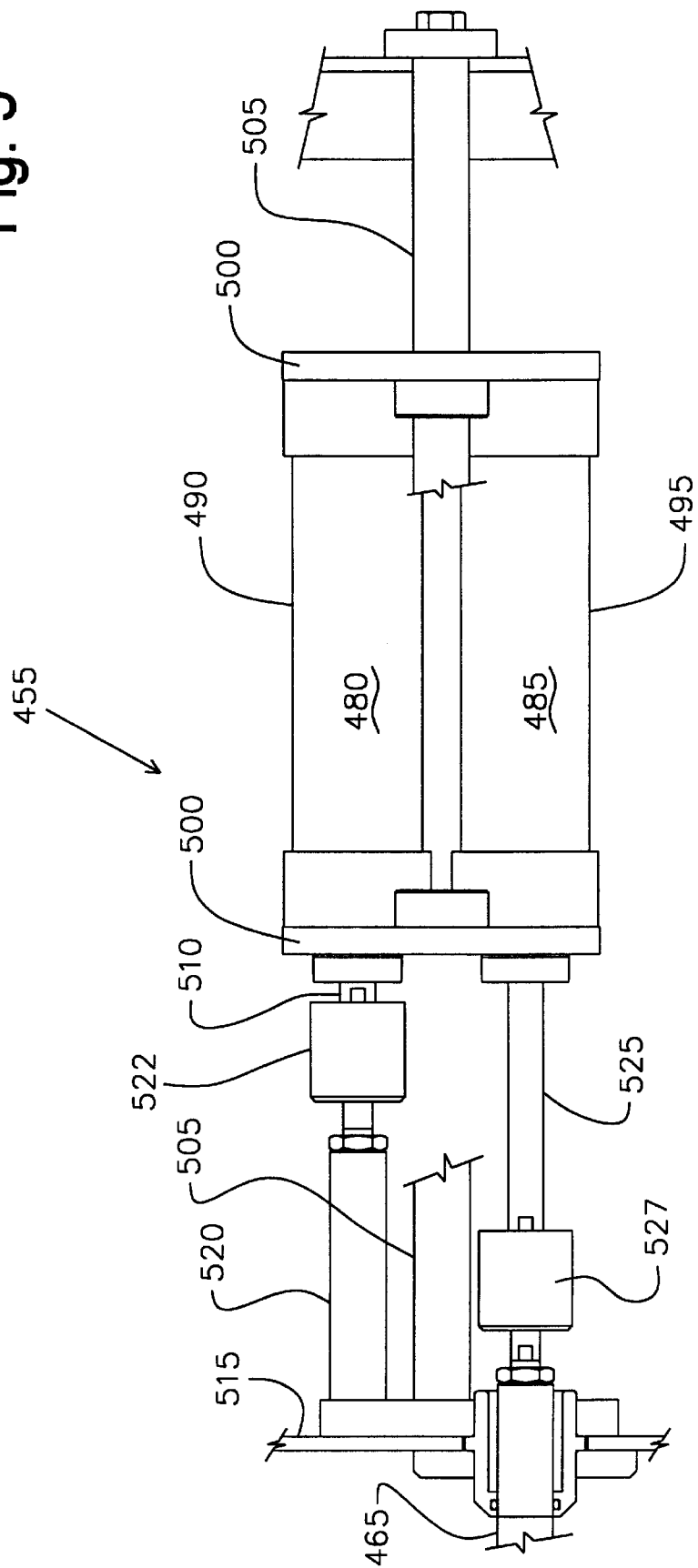
FIG. 5 illustrates one embodiment of a lateral drive suitable for laterally driving the input end of one of the strip conveyors.

FIG. 5 is a side view of one embodiment of a lateral drive 455 suitable for driving the input carriage section 315 while FIG. 4 shows a top view thereof. As shown, the lateral drive 455 comprises first and second linear actuators 480 and 485, preferably pneumatic piston drives, that are interconnected to provide three predetermined lateral positions for the input carriage 315. This interconnection comprises joining the housing 490 of the first linear actuator 480 to the housing 495 of the second linear actuator 485 using, for example, an appropriate pair of brackets 500. Each of the brackets 500 includes a pair of guide apertures, including any appropriate bushings, that accept a pair of guide rods 505 disposed on opposite sides of the first and second linear actuators 480 and 485. The piston rod 510 of the first linear actuator 480 is connected in fixed alignment with the wall 515 of the main housing 75 adjacent the conveyors of the system. Preferably, the piston rod 510 is connected to the wall 515 by a piston rod extension 520 and a self-aligning coupling 522. The piston rod extension 520 may be adjustable with respect to the piston rod 510 to vary the effective length of the piston rod 510. The piston rod 525 of the second linear actuator 485 is connected, either directly or indirectly through a further self-aligning coupling 527, to the shaft 465 to drive the input carriage 315.

Extension and retraction of the piston rods 510 and 525 causes the housings of the linear actuators 480 and 485 as well as the brackets 500 to move along the guide rods 505 in a lateral direction. Since the piston rods 510 and 525 are each only actuated between a fully extended position and a fully retracted position, and, further, each have the same effective length, the position of the input carriage 315 may take on three states depending on the states of the first and second linear actuators 480 and 485. In a first state of the linear drive 455, both the first and second linear actuators 480 and 485 have their piston rods 510 and 525 in a fully retracted state thereby placing the input carriage 315 at a middle position. In a second state of the linear drive 455, illustrated here in FIG. 5, the first linear actuator 480 has its piston rod 510 fully retracted while the second linear actuator 485 has its piston rod 525 in the fully extended state thereby placing the carriage 315 at a second position distal the wall 515. In a third state of the linear drive 455, the first linear actuator 480 has its piston rod 510 in a fully extended state while the second linear actuator 485 has its piston rod 525 in a fully retracted state thereby pulling the input carriage 315 to a position proximate the wall 515.

Although the linear drive 455 of the presently disclosed embodiment is only operable to drive the input carriage 315 to three finite positions, it will be recognized that other linear drive mechanisms may also be utilized. For example, a linear drive mechanism having a different number of finite positions may be used. Similarly, a continuous linear drive mechanism, such as a screw drive, servo motor drive (with the appropriate linkage), etc., may be used.

The product supplied from the upper and lower strip conveyors 50 and 55 is received by the output level shifting conveyor 60. To accommodate, when necessary, the dual streams of product from the output carriage sections 200, 205, 350, and 355, the output level shifting conveyor 60 comprises adjacent level shifting conveyor sections 540 and 545 respectively associated with each of the product streams. The conveyor sections 540 and 545 are attached at the output end to a common drive roller 550 which, for example, is driven by the continuous motor 255 (although it will be recognized that a servo motor may also be used) through an appropriate linkage 260. The motor 255 is used in the illustrated embodiment to drive the output conveyor sections of the upper and lower strip conveyors 50 and 55 as well as the drive roller 550 of the output level shifting conveyor 60.

The level shifting conveyor sections 540 and 545 are cantilevered structures that include respective idle rollers 553 and 555 at the input. The cantilevered structures of the sections 540 and 545 are adapted to be independently pivoted about and axis 560 defined by the drive roller 550 so that the respective input end of each of the sections 540 and 545 can be moved between an upper position at which the input end of the respective section is proximate the respective output carriage section of the upper level strip conveyor 50 and a lower position at which the input end of the respective section is proximate be respective output carriage section of the lower strip conveyor 55. Each level shifting conveyor section 540 and 545 is accordingly associated with a respective pivot motion drive 570. The pivot motion drive 570 shown here comprises a vertically oriented linear actuator 575, such as a pneumatic piston drive, which directly engages the respective level shifting conveyor section 540, 545.

Modular Row Staging Conveyor System

Figure 6:
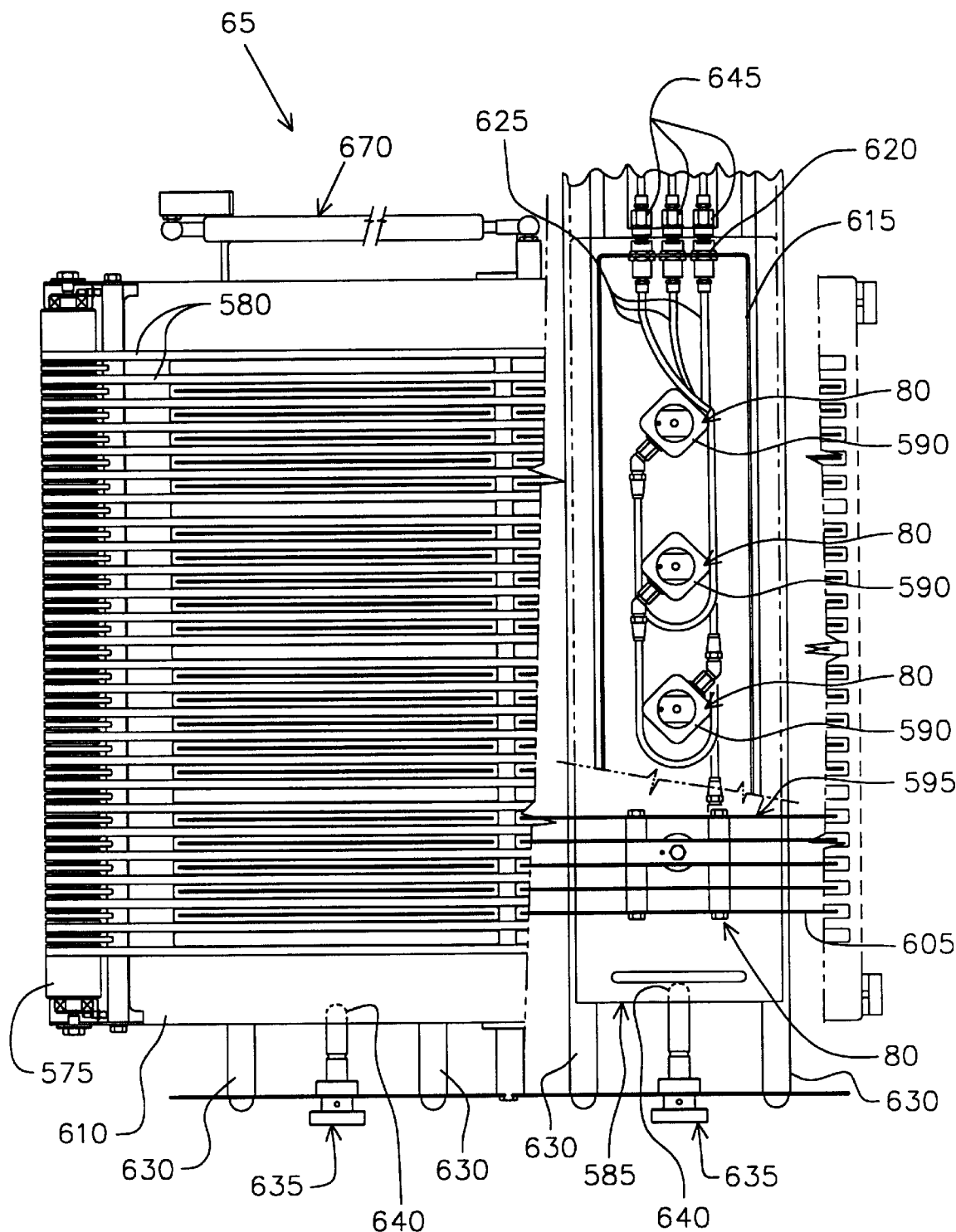
FIGS. 6 and 7 illustrate one embodiment of the row staging conveyor of the conveyor system of FIG. 1.
Figure 7:
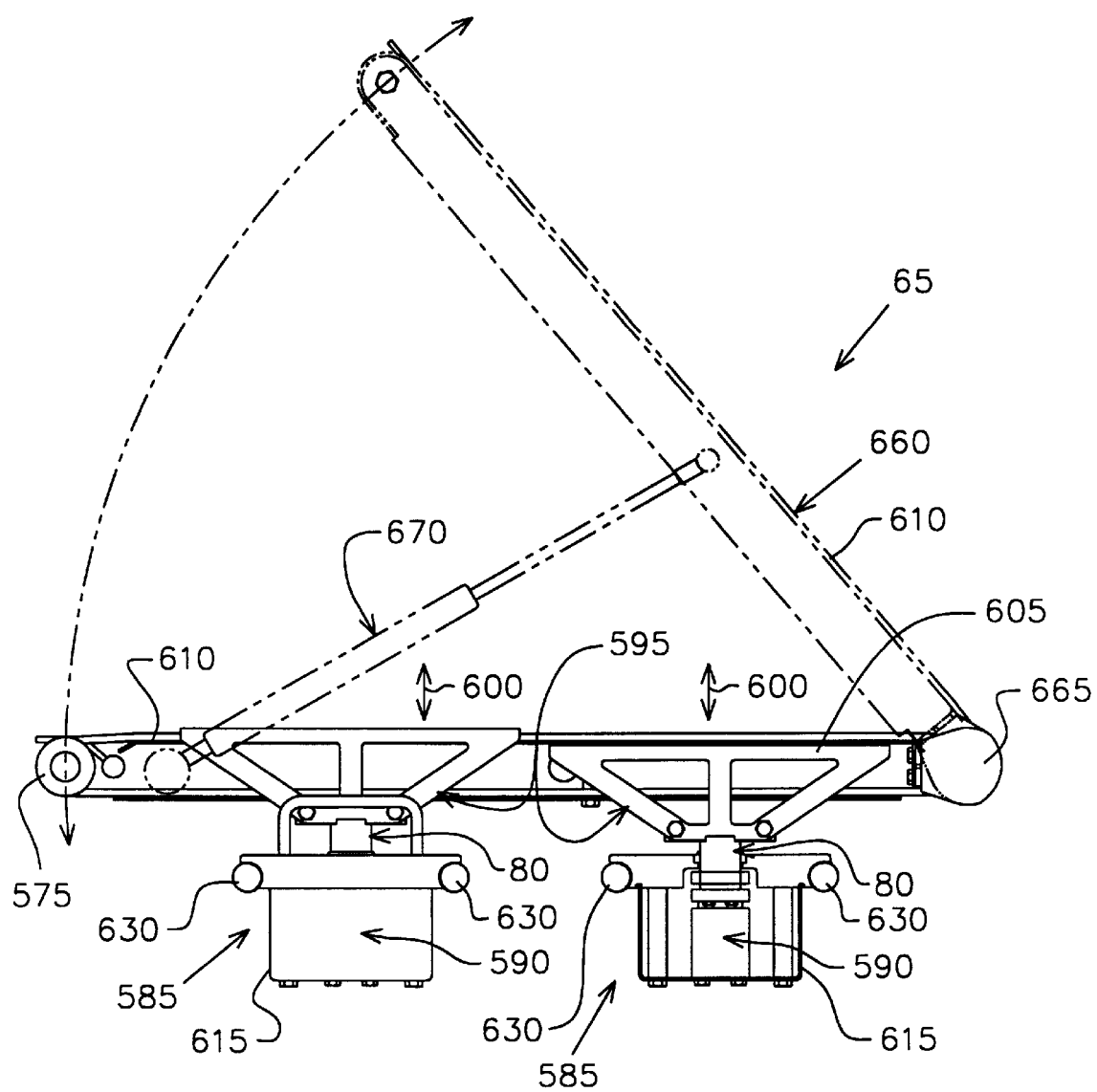

FIGS. 6 and 7 set forth one embodiment of the row staging conveyor 65. As illustrated, the row staging conveyor 65 comprises an input end sharing the drive roller 550 with the output level shifting conveyor 60, and an output end defined by an idle roller 575. A plurality of conveyor bands 580 extend between the drive roller 550 and the idle roller 575.

The illustrated embodiment of the row staging conveyor 65 comprises a unique modular arrangement of stop members which readily lends itself to fast and easy customization for a particular product format. To this end, an interchangeable, modular construction for housing the stop members is employed. In the exemplary embodiment, two stop modules 585 are employed. Each module 585 includes, for example, four stop members 80 disposed laterally along the row staging conveyor width. Each stop member 80 is comprised of an actuator section 590 which is connected to drive a stop grid section 595 in the vertical directions designated by arrows 600. The actuator section 590 preferably comprises a linear pneumatic actuator. The stop grid sections 595 comprise a plurality of longitudinally extending blades 605 that extend through an upper support surface 610 and are aligned with the interstitial regions between the conveyor bands 580. The actuator section 590 of each stop member 80 is operable to drive the blades 605 of the stop grid section 595 between a first position in which the top of the blades 605 are disposed at or below the top surface of the conveyor bands 580 and a second position in which the top of the blades 605 extend above the top surface of the conveyor bands 580. The first position is illustrated at the right-hand stop module 585 of FIG. 7 while the second position is illustrated at the left-hand stop module 585 thereof.

The stop members 80 of each stop module 585 are secured within a housing 615. At one end of the housing 615 there are a plurality of connectors 620 that are in fixed positional alignment with the housing 615. Each connector 620 is associated with a respective stop member 80 and more than one connector 620 may be associated with each stop member 80. Preferably, the plurality of connectors 620 are fixed to a wall of the housing 615 and extend therefrom through one or more housing apertures. In instances in which the actuator sections 590 comprise linear pneumatic actuators, the connectors 620 are quick-connect pneumatic connectors and at least two connectors are employed for each stop member 80. A pneumatic supply line 625 extends between each connector 620 and the respective stop member 80. To facilitate simultaneous activation of each of the stop members 80, each of the pneumatic supply lines 625 should be approximately the same length. It will be recognized that other connector and supply line types may be employed depending upon the type of actuator employed in the stop member 80.

Each stop module 585 is supported by a respective pair of lateral support rods 630 that engage corresponding notched structures in the housing 615. A screw-type lock mechanism 635 engages a seat structure 640 in the housing 615 of each stop module 585. The lock mechanisms 635 urge the respective stop modules 585 in a lateral direction so that the plurality of connectors 620 of each stop module 585 engage corresponding connectors 645 that are in fixed positional alignment with the frame of the conveyor system.

With reference to FIG. 7, there is shown one embodiment of the row staging conveyor 65 that includes structures that adapt it for use with the stop modules 585. As illustrated, a pivotable conveyor section 660, including the associated conveyor bands and roller of the row staging conveyor 65, may be pivoted about its input end 665 to the position shown in phantom outline to expose the lateral support rods 630 for insertion of the stop modules 80. An air-spring 670 or the like may extend between the frame of the conveyor system and the pivotable conveyor section 660 to provide support for the conveyor section 660 when in the open, upright position. Once the stop modules 585 are in place upon the lateral support rods 630, the adjustment mechanisms 635 are used to urge the stop modules 585 in the direction of the connectors 645 to thereby automatically secure the connectors 620 with the corresponding connectors 645 without the need for manual manipulation of any supply lines.

Variations of the basic modular structure of the disclosed embodiment are also possible. For example, the stop modules 585 may be inserted through an opening in a sidewall of the row staging conveyor 65, rather than through the open top illustrated in FIG. 7. Additionally, the actuators of the stop members 80 may be linear drive mechanisms that are actuated by electrical control signals. In such instances, the connectors 620 and 645 would be electrical connectors and the supply lines 625 would be electrical conductors.

The basic modular structure of the disclosed embodiment facilitates quick and inexpensive configuration of the conveyor system 25 to a variety of product formats. This is due, at least in part, to the fact that the row staging conveyor 65 of the conveyor system 25 is adapted to receive a basic stop module configuration, notwithstanding the number or placement of the stop members 80 disposed therein. The stop members 80 within each stop module 585 are spaced from one another and are numbered for the requisite product format. As such, a conveyor system configuration adapted to provide a product format having two products per row has the same basic components as a conveyor system configuration adapted to provided a product format having three products per row. The principal difference between the basic system components of the two conveyor systems would lie in the spacing and number of stop members 80 disposed within the respective stop modules 585.

Output Conveyor System

Figure 8:
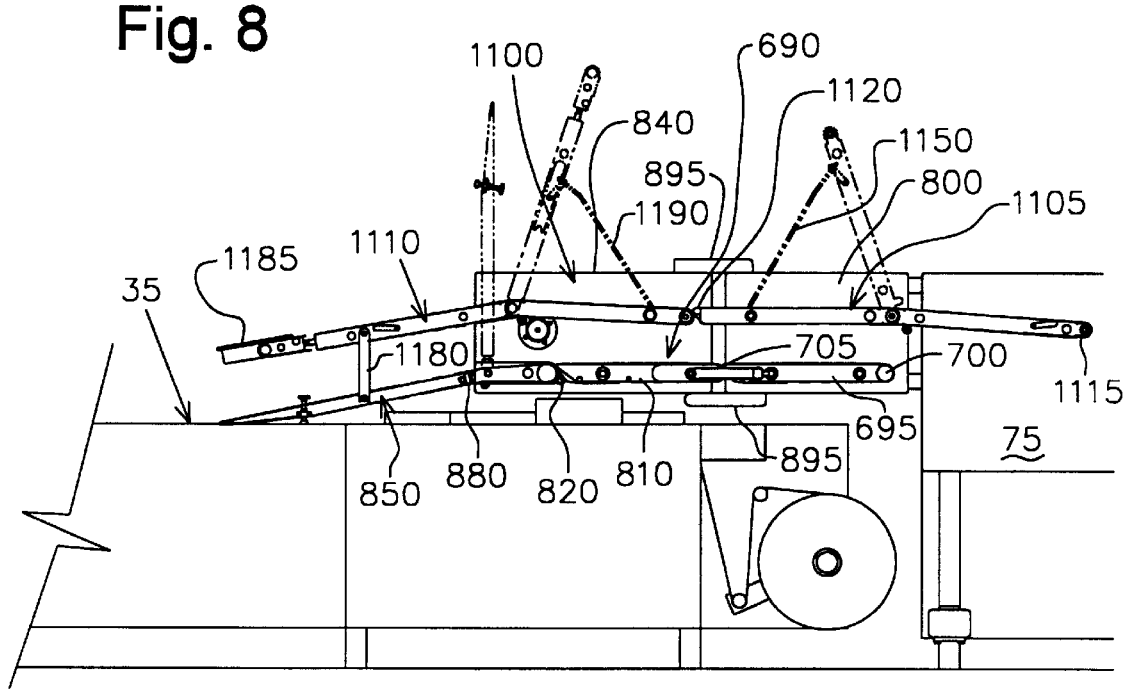
FIG. 8 is a side view of one embodiment of an output and reject conveyor system suitable for use with the basic conveyor system of FIG. 1.
Figure 9:
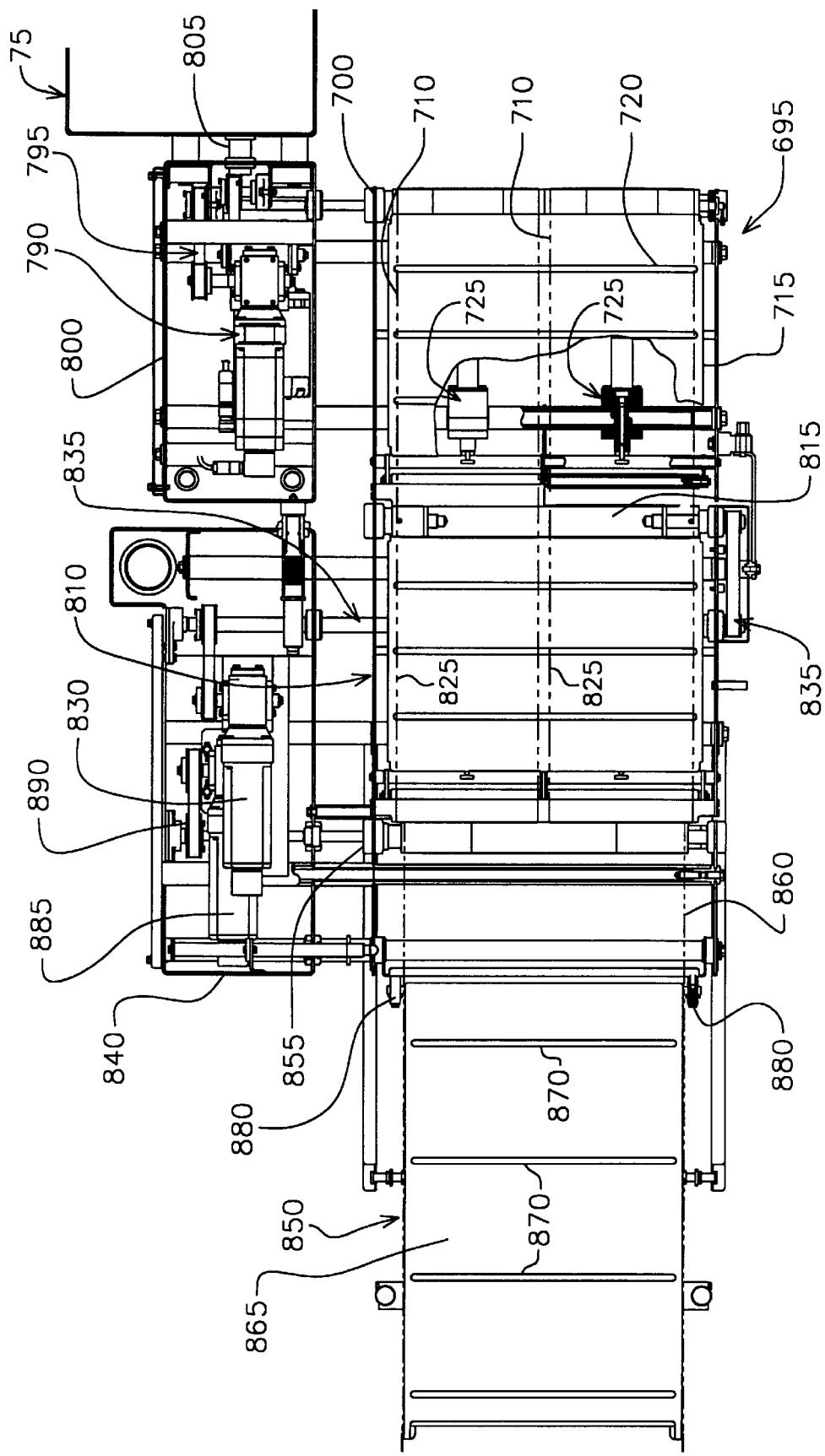
FIG. 9 is a top view of the output conveyor system of FIG. 8 with certain portions thereof in cross-sectional view.

Referring to FIGS. 8 and 9, there is shown one embodiment of an output conveyor system 690 for transferring the laterally formatted product from the row staging conveyor 65 to the packaging machine 35. In the illustrated embodiment, the laterally formatted product from the row staging conveyor 65 is supplied to a first accumulator conveyor 695. The first accumulator conveyor 695 includes a drive roller 700 at one end thereof and a polished nose portion 705 at the other end thereof. At least one conveyor belt extends between the drive roller 700 and the nose portion 705. In the illustrated embodiment, two flat belts 710 are used to convey the formatted product along the first accumulator conveyor 695. The flat belts 710 are supported by a surface 715 that includes a plurality of upstanding ridges 720 that reduce friction.

Figure 10:
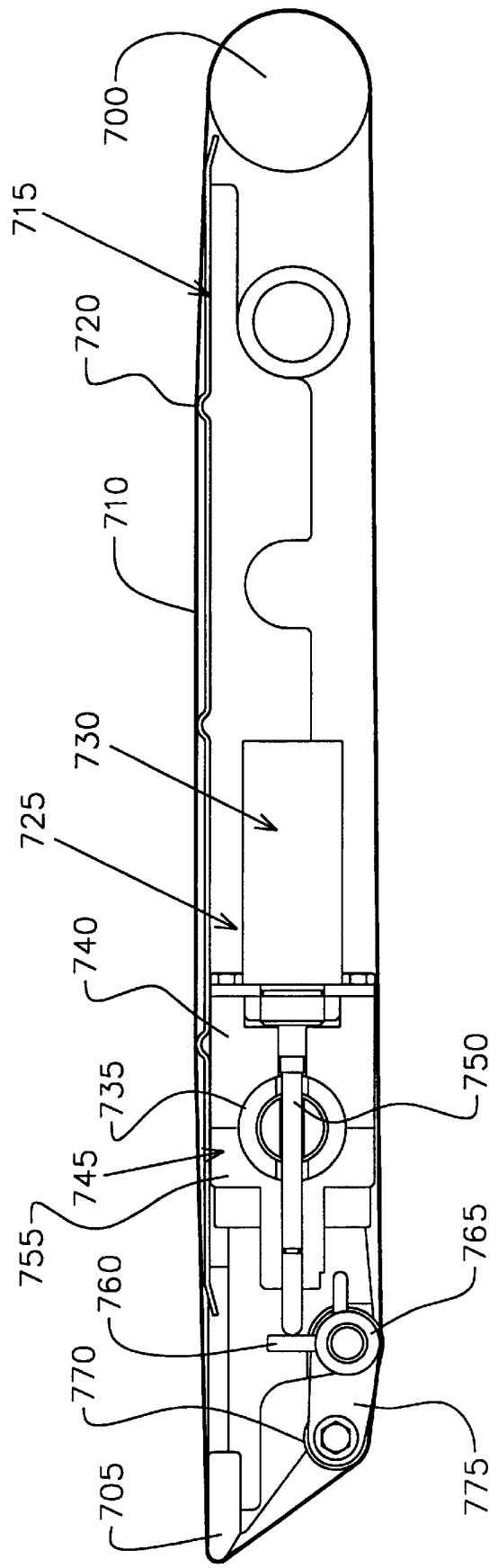
FIG. 10 is a side, cross-sectional view of one embodiment of an accumulator conveyor illustrating the associated tensioning mechanism.
Figure 11:
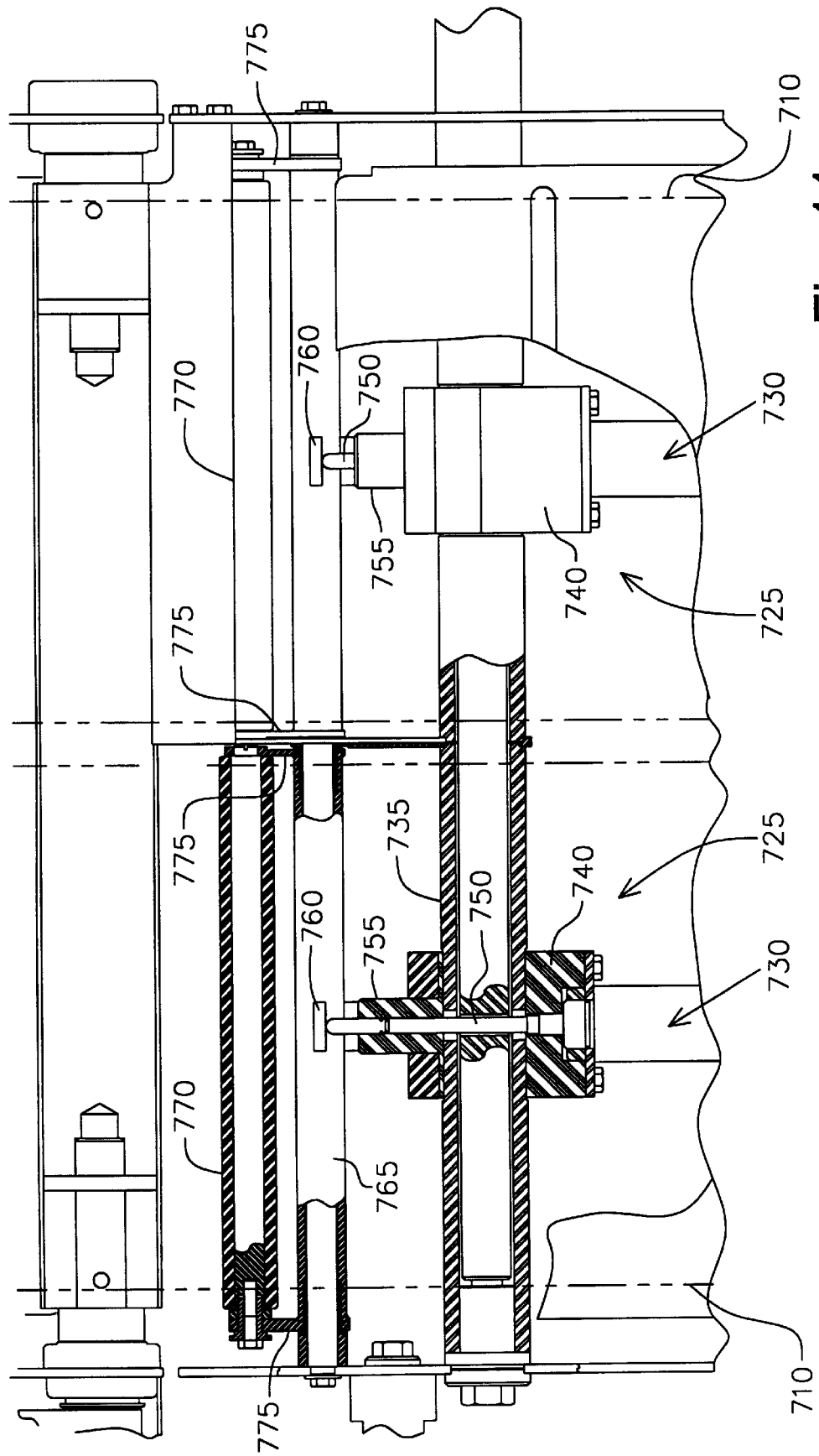
FIG. 11 is a top view of the tensioning mechanism of FIG. 10 with certain sections thereof in partial cross-section.

Each belt 710 is provided with the proper tension through a respective tension adjustment mechanism 725. One embodiment of such a tension adjustment mechanism 725 suitable for use in the disclosed conveyor system is best described in connection with FIGS. 10 and 11.

As illustrated, each tension adjustment mechanism 725 includes a linear actuator 730, such as a pneumatic actuator, that is, for example, mounted to a support shaft structure 735 of the conveyor system. The linear actuator 730 may be a nose-mounted device that is secured to a first half 740 of a mounting block 745. The linear actuator 730 includes a push rod 750 that extends from the main body thereof through apertures in the first half 740 of mounting block 745, the support shaft structure 735, and the second half 755 of mounting block 745. The push rod 750 protrudes from the second half 755 of mounting block 745 to engage a corresponding flag 760 that extends radially outward from a pivot cylinder 765. The pivot cylinder 765 is connected to a tension roller 770 by one or more brackets 775.

In operation, the push rod 750 of the linear actuator 730 applies a constant torque to the pivot cylinder 760. The application of the constant torque rotates the tension roller 770 about the pivot cylinder 760 thereby applying a tension to the respective belt 710.

The drive roller 700 is preferably driven by a servo motor 790 through a corresponding linkage 795. The servo motor 790 and corresponding linkage 795 are disposed in a first extension housing 800 that is cantilevered from the main housing 75 and, as illustrated, may overlie a portion of the packaging machine 35. Electrical power and control signals for controlling the operation of the servo motor 790 are provided from the components within the main housing 75 to the components within the first extension housing 800 through one or more protective tube sheaths 805.

The product from the first accumulator conveyor 695 may be supplied to yet another, second accumulator conveyor 810. The second accumulator conveyor 810 includes a drive roller 815 at one end thereof and a polished nose portion 820 at the other end thereof with at least one conveyor band or belt extending therebetween. In the illustrated embodiment, there are two flat conveyor belts 825 that are utilized. As with the first accumulator conveyor 695, a tensioning mechanism is preferably associated with each of the belts 825.

The drive roller 815 is preferably driven by a servo motor 830 through a corresponding linkage 835. The servo motor 830 and corresponding linkage 835 are disposed in or in fixed alignment with a second extension housing 840 that is cantilevered from the first extension housing 800 and, as illustrated, may overlie the packaging machine 35.

The formatted product from the second accumulator conveyor 810 of the illustrated embodiment is supplied to an output conveyor 850 that transfers the product to open top containers of the packaging machine 35. The output conveyor 850 includes a drive roller 855 that is used to drive a flat belt 860 which conveys the formatted product to the packaging machine 35. As illustrated, the end of the output conveyor 850 distal the drive roller 855 is honed to a narrow edge to provide a smooth transition of the product from the output conveyor to the containers of the packaging machine 35. A belt support surface 865 engages the underside of the belt 860 at a plurality of upstanding ridges 870. An adjustment mechanism 880 is used to adjust the tension of the flat belt 860.

Figure 12:
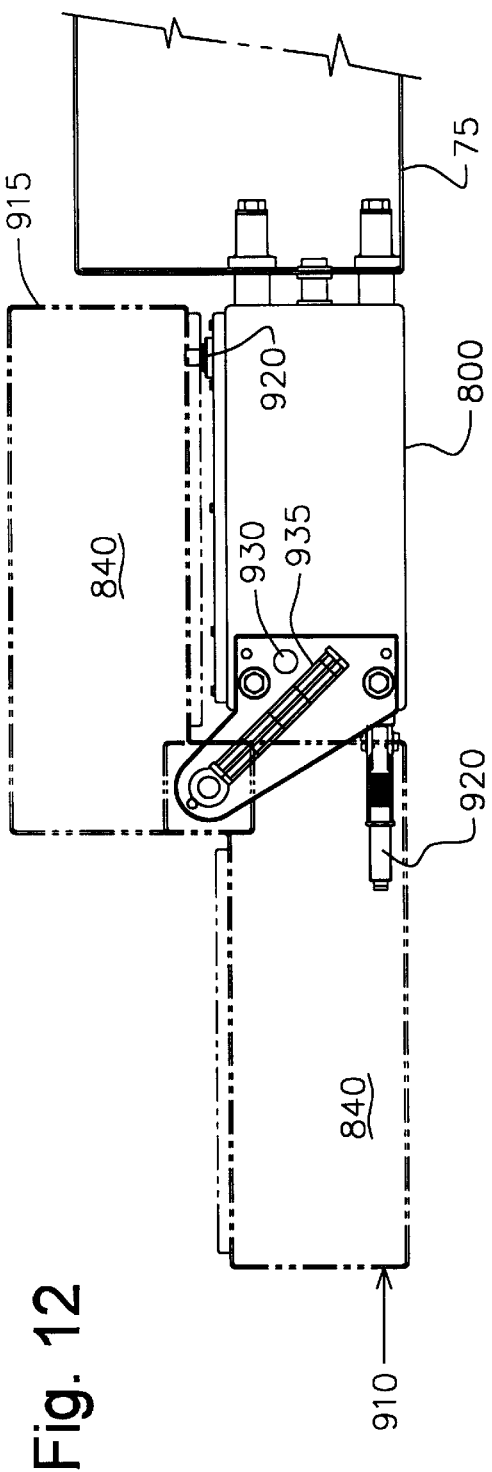
FIGS. 12 and 13 illustrate one manner of providing the output conveyor system of FIG. 8 with a pivotable output section.
Figure 13:
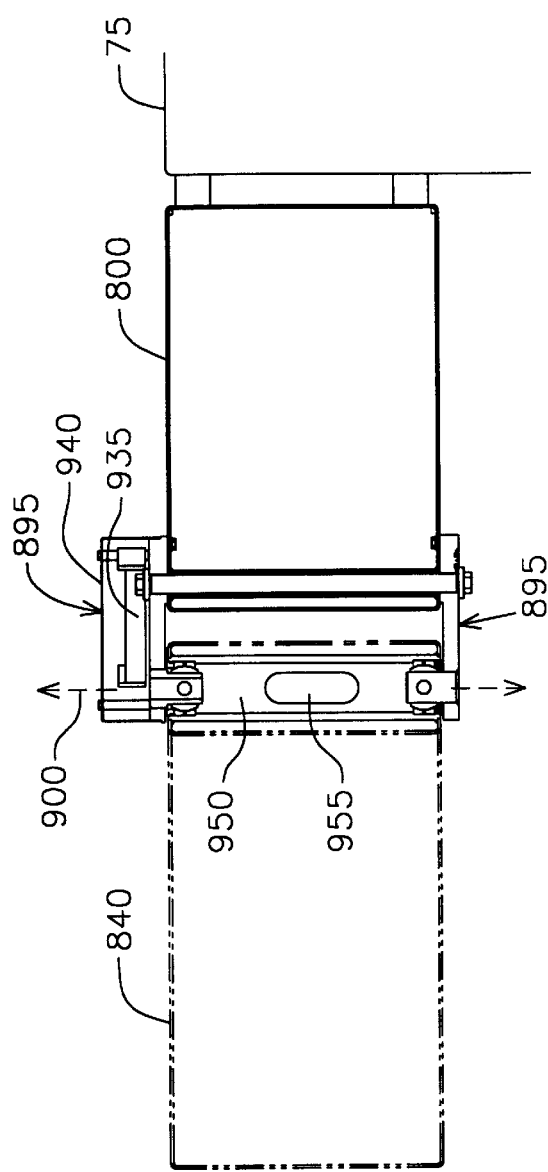

The output conveyor 850 is preferably driven by a servo motor 885 disposed in the second extension housing 840 through a corresponding linkage 890. The servo motor 885 has its motion coordinated with the indexed motion of the open top containers of the packaging machine 35. Preferably, the second extension housing 840 is connected to the first extension housing 800 at a hinged joint including upper and lower hinges 895. As shown in FIGS. 12 and 13, the hinges 895 allow the second extension housing 840 and the attached accumulator conveyor 810 and output conveyor 850 to pivot about axis 900 between the position 910 shown in phantom outline and the position 915 also shown in phantom outline. It may be useful to provide shock absorbers 920 in one or both of the extension housings 800, 840 to reduce the likelihood of impact damage that may otherwise result when the extension housing 840, the accumulator conveyor 810, and the output conveyor 850 are pivoted about the axis 900 to their extreme positions.

Electrical power and control signals for controlling the operation of the servo motors 830 and 885 are provided from the components within the first extension housing 800 to the components within the second extension housing 840. In a preferred interconnection, one or more conductors extend through an upper aperture 930 in the first extension housing 800 and are terminated at a terminal block 935 disposed beneath a cover 940 of the upper hinge 895. A corresponding plurality of conductors are also connected to the terminal block 935 and extend downward through a cable channel 950. The plurality of conductors then extend from the channel 950 through an aperture 955 and into the interior of the second extension housing 840 for connection to the appropriate drive components. This interconnection allows the accumulator conveyor 810 and/or the output conveyor 850 to be operated even when the second extension housing 840 is in the position designate at 915 of FIG. 12.

Reject Conveyor Systems

Figure 15:
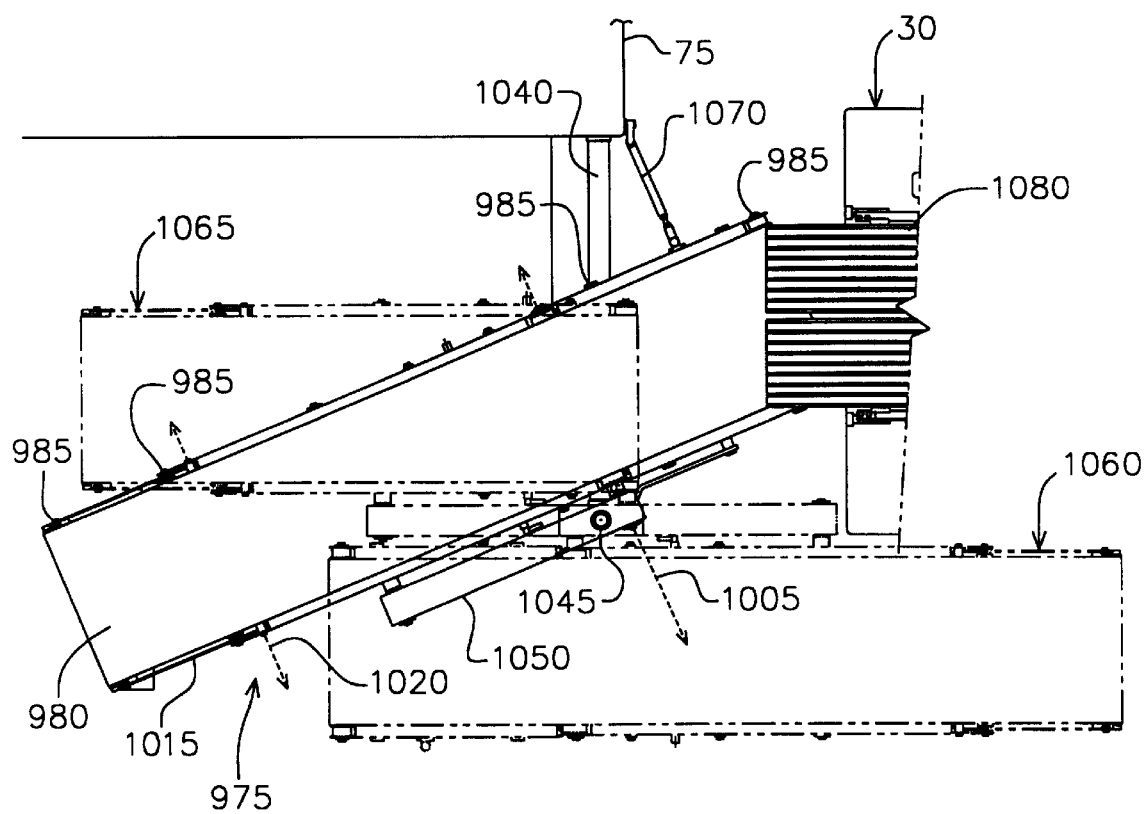
FIGS. 15 and 16 illustrate a further embodiment of a reject conveyor system suitable for use with the system illustrated in FIG. 1.
Figure 16:
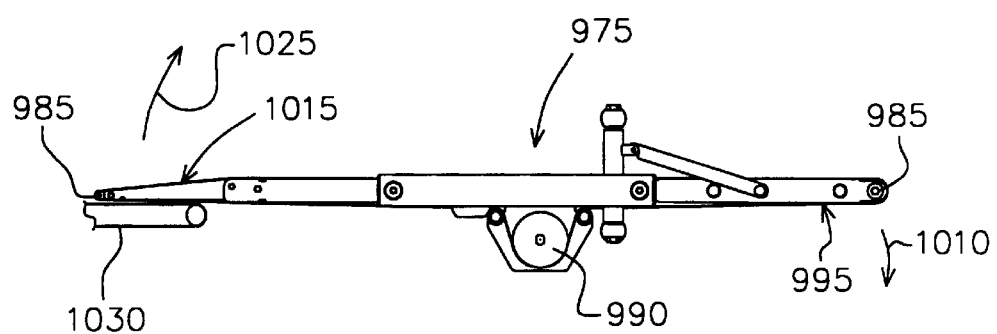

The conveyor system 25 may incorporate one or more additional conveyors for handling off-weight or otherwise rejected product. To this end, two embodiments of different reject conveyor systems are disclosed herein and are illustrated in FIGS. 8 and 14–16. With reference to FIGS. 15 and 16, there is shown one embodiment of a reject conveyor system 975 that conveys rejected product along a path that is laterally adjacent the path taken by non-rejected product. The reject conveyor system 975 comprises a flat belt 980 disposed over a plurality of idle rollers 985. The flat belt 980 is driven by a continuous motor 990 disposed at the underside of the reject conveyor system 975 that frictionally engages the belt surface and drives it over the idle rollers 985. Preferably, the reject conveyor system 975 includes an input section 995 that may pivot downward about a pivot axis 1005 in the direction of arrow 1010 and an output section 1015 that may pivot upward about a pivot axis 1020 in the direction of arrow 1025. Latching mechanisms may be used to secure the input few and output sections 995 and 1015 in their operating positions. The output section 1015 may be honed in the illustrated manner to facilitate transfer to a further reject conveyor or table 1030.

The reject conveyor system 975 is supported by a laterally extending support 1040 which is fixed with the main housing 75 at one end thereof and which is terminated at a pivot rod 1045 at the other end thereof. The pivot rod 1045 engages a corresponding pivot aperture in a support 1050 that is fixed to the reject conveyor 975. The resulting pivot connection allows the reject conveyor 975 to rotate about an axis defined by the pivot rod 1045 through a range of motion from a first position 1060 illustrated in phantom outline to a second position 1065 illustrated in phantom outline. In operation, the reject conveyor 975 is fixed at an angle and has its input section 995 secured to the main housing 75 with a securement arm 1070.

In the illustrated embodiment, the reject conveyor 975 receives rejected (off-weight) product directly from a reject conveyor 1080 of, for example, the slicing machine 30. The rejected product is then conveyed, for example, to the further reject conveyor or table 1030 where operating personnel may reuse, re-stack, or otherwise re-process the rejected product. As such, the rejected product is prevented from reaching the input conveyor 40 and/or the input level shifting conveyor 45 of the main conveyor system path.

Figure 14:
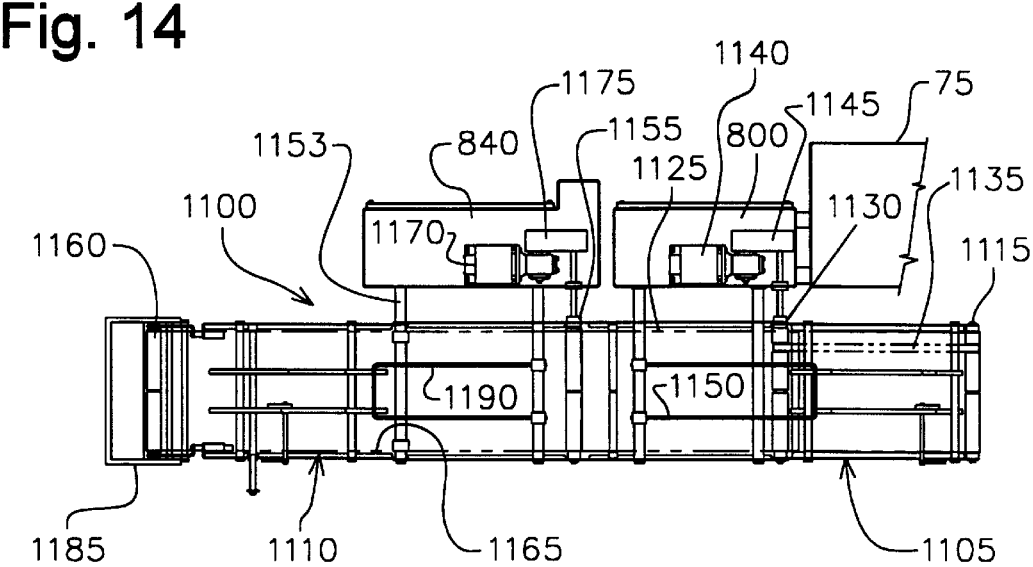
FIG. 14 is a top view of the reject conveyor system of FIG. 8 with certain sections thereof in cross-sectional view.

An alternative reject conveyor system is shown at 1100 in FIGS. 8 and 14. As illustrated, the reject conveyor system 1100 is arranged to transfer rejected product along an overhead path that overlays the path taken by on-weight or otherwise non-rejected product. The reject conveyor system 1100 comprises first and second conveyor sections 1105 and 1110. The first reject conveyor section 1105 includes an input roller 1115 and an output nose section 1120 with a flat belt 1125 extending therebetween. The tension on the flat belt 1125 may be adjusted and maintained by an appropriate tensioning mechanism (not illustrated).

The input roller 1115 is connected to a drive roller 1130 by a drive belt 1135 or the like. The drive roller 1130, in turn, is driven by, for example, a continuous or intermittent motor 1140 through a corresponding linkage 1145. The motor 1140 and corresponding linkage 1145 are preferably contained within the first extension housing 800. The input end of the first reject conveyor section 1105 may be pivoted about an axis defined by the drive roller 1130 as shown in phantom outline. When disposed in its raised position, the first reject conveyor 1105 may be supported by a support bracket 1150 that is pivotable between a lower rest position shown in FIG. 14 and an upper raised position shown in phantom in FIG. 8.

The second reject conveyor section 1110 includes a drive roller 1155 at the input end thereof and an idle roller 1160 at the output end thereof with a flat belt 1165 extending therebetween. The drive roller 1155 is driven by, for example, a continuous motor 1170 through a corresponding linkage 1175. The continuous motor 1170 and corresponding linkage 1175 are preferably contained within the second extension housing 840.

The output end of the second reject conveyor section 1110 is supported by one or more brackets 1180 that extend from the second reject conveyor section 1110 to engage one or more corresponding connections on the output conveyor 850. A product catcher 1185 may terminate the output end of the second reject conveyor section 1110 and may be used to contain and accumulate the off-weight or otherwise rejected product. The output end of the second reject conveyor section 1110 may be pivoted about an axis defined by the support shaft 1153 as shown in phantom outline. When disposed in its raised position, the output end of the second reject conveyor 1110 may be supported by a support bracket 1190 that is pivotable between a lower rest position shown in FIG. 14 and an upper raised position shown in phantom in FIG. 8.

In the reject conveyor system 1100 of FIGS. 8 and 14, rejected product is received by the reject conveyor system 1100 from the upper strip conveyor 50. Accordingly, with reference to FIGS. 1 and 3, a bridge conveyor 1205 is used to direct product from the upper strip conveyor 50 to the first reject conveyor section 1105. As illustrated, the bridge conveyor 1205 comprises adjacent hinged conveyor sections 1210 and 1215 respectively associated with and connected for co-movement with the output conveyor sections 540 and 545. The bridge conveyor 1205 is preferably driven by the continuous motor 255 through the linkage 260. The operation of the input and output level shifting conveyors 45, 60 is coordinated with the sensing of off-weight product by the slicing machine 30 to direct the off-weight or otherwise rejected product to the reject conveyor system 1100.

Formatting Operations

The conveyor system 25 may be used to arrange one or more product streams into a wide range of product formats. Examples of how the conveyor system 25 may be operated to provide such formats is set forth below in connection with FIGS. 17–22.

FIG. 17 illustrates one manner of operating the conveyor system 25 to receive a single, sequential product stream and format the stream to provide a product format wherein each row of product comprises two adjacent products on the proper centers required by the packaging machine. In this formatting operation, the level shifting conveyor sections 90, 95 of the input level shifting conveyor 45 are operated in unison whereby both of the conveyor sections 90 and 95 are either raised or lowered simultaneously. This is desirable in view of the fact that the product is received at a central location spanning both of the conveyor sections 90 and 95. Additionally, the output carriage assemblies 200 and 205 of the upper strip conveyor 50 are located immediately adjacent one another and are disposed laterally as a single unit to transfer any product that it receives to the output level shifting conveyor 60 at the desired product center for the particular format. Likewise, the output carriage assemblies 350 and 355 of the lower strip conveyor 55 are adjacent one another and are laterally aligned as a single unit to transfer any product that it receives to the output level shifting conveyor 60 at the desired product center for the particular format. The lateral alignment of the output carriage assemblies 200 and 205 of the upper strip conveyor 50 differs from the lateral alignment of the output carriage assemblies 350 and 355 of the lower strip conveyor 55 by an amount corresponding to the lateral spacing of the product for the particular product format. This is illustrated in FIG. 17 by the dimension A.

With reference to FIG. 17, the level shifting operation of the conveyor system 25 to provide the proper lateral alignment for the desired format is illustrated. As shown, the first product 1280 for use in forming a first row of formatted product is shifted to the lower strip conveyor 55 (as noted by the "L" label on the product 1280) by the input level shifting conveyor 45. The second product 1285 for use in forming the first row of formatted product is shifted to the upper strip conveyor 50 by the input level shifting conveyor 45 (as designate by the "U" label on the product 1285).

The upper and lower strip conveyors 50 and 55 direct the first and second products 1280 and 1285 to their respective lateral positions. When the first product 1280 arrives at the output of the lower strip conveyor 55, it is received by the output level shifting conveyor 60 and directed to the row staging conveyor 65. When the conveyor system 25 detects that the first product 1280 is present at the stop module 585 the stop member 80 corresponding to the lateral position of the first product 1280 is actuated to lift the product 1280 from the conveyor bands 580. Similarly, when the second product 1285 arrives at the output of the upper strip conveyor 50, it is received by the output level shifting conveyor 60 and directed to the row staging conveyor 65. When the conveyor system 25 detects that the second product 1285 is present at the stop module 585, the stop member 80 corresponding to the lateral position of the second product 1285 is actuated to lift the product 1285 from the conveyor bands 580. Once the first and second products 1280 and 1285 are longitudinally aligned in a row by their respective stop members, both stop members concurrently release the first and second products for transport to, for example, the first accumulator conveyor 695. Since the accumulator conveyor 695 is driven by a servo motor 790, its motion may be accurately controlled to align subsequent rows of product longitudinally as needed by the packaging machine 35. Such a longitudinal spacing operation may likewise be performed by the second accumulator conveyor 810.

As shown in FIG. 17, the first product 1290 for use in forming the next row of formatted product is provided to the upper strip conveyor 50 while the second product 1295 for use in forming this next row of formatted product is provided to the lower strip conveyor 55. Such alternating operation reduces the number of moves required of the input and output level shifting conveyors 45 and 65 thereby reducing wear and fatigue their respective components.

FIG. 18 illustrates one manner of operating the conveyor system 25 to receive a single, sequential product stream and format the stream to provide a product format wherein each row of product comprises three adjacent products on the proper centers required by, for example, the packaging machine 35. In this formatting operation, the level shifting conveyor sections 90 and 95 of the input level shifting conveyor 45 are operated in unison whereby both of the conveyor sections 90 and 95 are either raised or lowered simultaneously. This is desirable in view of the fact that the product is received at a central location spanning both of the conveyor sections 90 and 95.

The output carriage assemblies 200 and 205 of the upper strip conveyor 50 are disposed immediately adjacent one another and are aligned laterally as a single unit to transfer any product that it receives to the output level shifting conveyor 60 at the desired product center for the particular format. The output carriage assemblies 350 and 355 of the lower strip conveyor 55, however, are separated from one another by a predetermined distance B. In the illustrated embodiment, the distance B corresponds to the lateral spacing between the outermost products of a formatted row of product while the position of the output carriage assemblies of the upper strip conveyor 50 correspond to the lateral position of the middle product of a formatted row of product.

With reference to FIG. 18, the first product 1300 that is to be used to form a first row of formatted product is provided to the lower strip conveyor 55. The input section 315 of the lower strip conveyor 55 is disposed at a first lateral position when it receives the first product 1300. The first lateral position corresponds to the position required to direct the first product 1300 to a first one of the output carriage assemblies. Once the first product 1300 has been received, the input section 315 of the lower strip conveyor 55 is moved to a second lateral position. The second lateral position corresponds to the position required to direct any product that it receives to a second one of the output carriage assemblies. This lateral shift of the input section 315 of the lower strip conveyor 55 is illustrated by the arrow 1305.

The second product 1310 that is to be used to form the first row of formatted product is provided to the upper strip conveyor 50 by the input level shifting conveyor 45. The third product 1315 that is to be used to form the first row of formatted product is provided to the lower strip conveyor 55 by the input level shifting conveyor 45. The third product 1315 is supplied to the lower strip conveyor 55 when the input section 315 is in the second lateral position thereby directing the third product 1315 to a lateral position that differs from the lateral position of the first product 1300.

As each of the first, second, and third products 1300, 1310, and 1315 sequentially exit the upper and lower strip conveyors 50 and 55, they are directed to the row staging conveyor 65 by the output level shifting conveyor 60. The stop members 80 respectively corresponding to the lateral positions of the first, second, and third products 1300, 1310, and 1315 are also sequentially activated as each of the products arrive to thereby lift the products from the conveyor bands 580 and align them in a single row.

Once the products are longitudinally aligned in a row by their respective stop members, the stop members are actuated to concurrently release the products as a formatted row for transport to, for example, the first accumulator conveyor 695. As noted above, one or both of the accumulator conveyors 695 and 810 may be used to longitudinally space successive rows of formatted product.

As shown in FIG. 18, the first product 1320 used to form the next formatted row of product is provided to the lower strip conveyor 55 when the input section 315 is at the second lateral position. By employing the illustrated alternating sequence of lateral movement of the input section 315, wear and fatigue of the components used to laterally move the input section are reduced.

Figure 19:
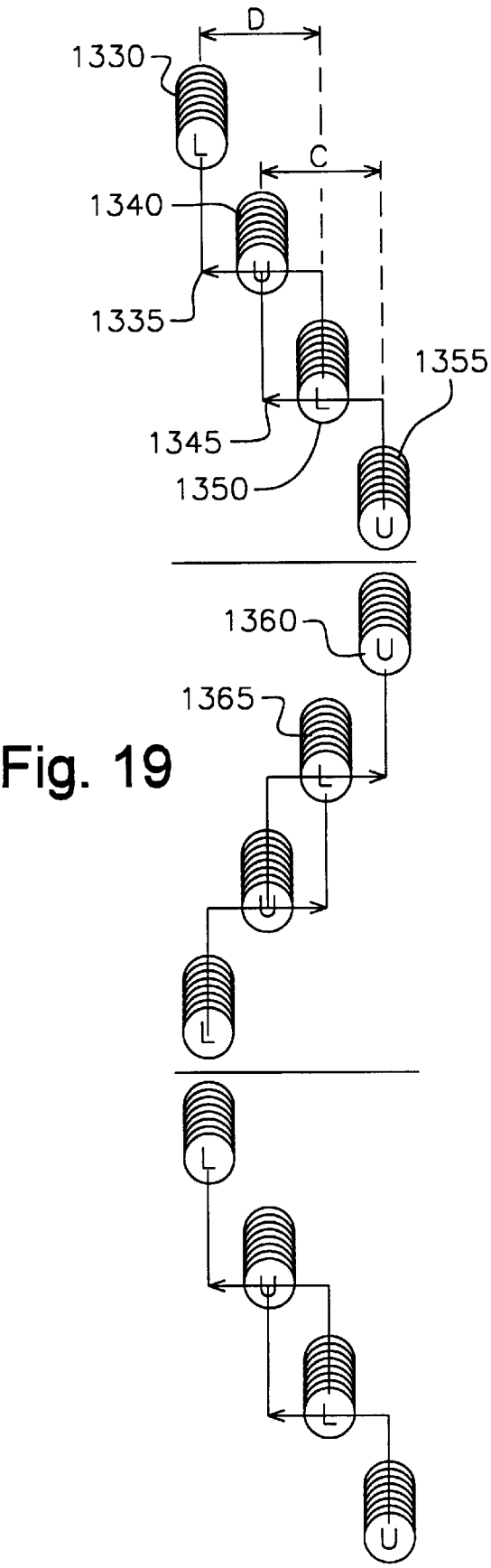

FIG. 19 illustrates one manner of operating the conveyor system 25 to receive a single, sequential product stream and format the stream to provide a product format wherein each row of product comprises four adjacent products on the proper centers required by, for example, the packaging machine 35. As in the previously described formatting operations, the level shifting conveyor sections 90 and 95 of the input level shifting conveyor 45 are operated in unison whereby both of the conveyor sections 90 and 95 are either raised or lowered simultaneously. This is desirable in view of the fact that the product is received at a central location spanning both of the conveyor sections 90 and 95.

The output carriage assemblies 200 and 205 of the upper strip conveyor 50 are disposed laterally from one another a predetermined distance C to transfer any product that it receives to the output level shifting conveyor 60 at the desired product centers for the particular format. The output carriage assemblies 350 and 355 of the lower strip conveyor 55, similarly, are separated from one another by a predetermined distance D. In the illustrated embodiment, the distance D corresponds to the lateral spacing between the first and third products of a formatted row of product while the distance C corresponds to the lateral spacing of the second and fourth products of a formatted row of product.

With reference to FIG. 19, the first product 1330 that is to be used to form a first row of formatted product is provided to the lower strip conveyor 55. The input section 315 of the lower strip conveyor 55 is disposed at a first lateral position when it receives the first product 1330. The first lateral position corresponds to the position required to direct the first product 1330 to a first one of the output carriage assemblies. Once the first product 1330 has been received, the input section 315 of the lower strip conveyor 55 is moved to second lateral position. The second lateral position corresponds to the position required to direct any product that it receives to a second one of the output carriage assemblies. This lateral shift of the input section 315 of the lower strip conveyor 55 is illustrated by the arrow 1335.

The second product 1340 that is to be used to form the first row of formatted product is provided to the upper strip conveyor 50. The input section 160 of the upper strip conveyor 50 is disposed at a first lateral position when it receives the second product 1340. The first lateral position corresponds to the position required to direct the second product 1340 to a first one of the output carriage assemblies of the upper strip conveyor 50. Once the second product 1340 has been received, the input section 160 of the upper strip conveyor 50 is moved to a second lateral position. The second lateral position corresponds to the position required to direct any product that it receives to a second one of the output carriage assemblies of the upper strip conveyor 50. This lateral shift of the input section 160 of the upper strip conveyor 50 is illustrated by the arrow 1345.

The third product 1350 that is to be used to form the first row of formatted product is provided to the lower strip conveyor 55 by the input level shifting conveyor 45. The third product 1350 is supplied to the lower strip conveyor 55 when the input section 315 is in the second lateral position thereby directing the third product 1350 to a lateral position that differs from the lateral position of the first and second products 1330 and 1340.

The fourth product 1355 that is to be used to form the first row of formatted product is provided to the upper strip conveyor 50 by the input level shifting conveyor 45. The fourth product 1355 is supplied to the upper strip conveyor 50 when the input section 160 is in the second lateral position thereby directing the fourth product 1355 to a lateral position that differs from the lateral position of the first, second, and third products 1330, 1340, and 1350.

As each of the first, second, third, and fourth products sequentially exit the upper and lower strip conveyors 50 and 55, they are directed to the row staging conveyor 65 by the output level shifting conveyor 60. The stop members 80 respectively corresponding to the lateral positions of the products are sequentially activated as each of the products arrive to thereby lift the products from the conveyor bands 580 and align them in a single row.

Once the products are longitudinally aligned in a row by their respective stop members, the stop members are actuated to concurrently release the products as a formatted row for transport to, for example, the first accumulator conveyor 695. As noted above, one or both of the accumulator conveyors 695 and 810 may be used to longitudinally space successive rows of formatted product.

As shown in FIG. 19, the first product 1360 used to form the next formatted row of product is provided to the upper strip conveyor 50 when the input section 160 is at the second lateral position while the second product 1365 that is used to form the next formatted row of product is provided to the lower strip conveyor 55 when the input section 315 is at the second lateral position. By employing the illustrated alternating sequence of lateral movement of the input sections and the alternating sequence of directing the product between the upper and lower strip conveyors, wear and fatigue of the components used to laterally move the input sections and the level shifting components are reduced.

Figure 20:
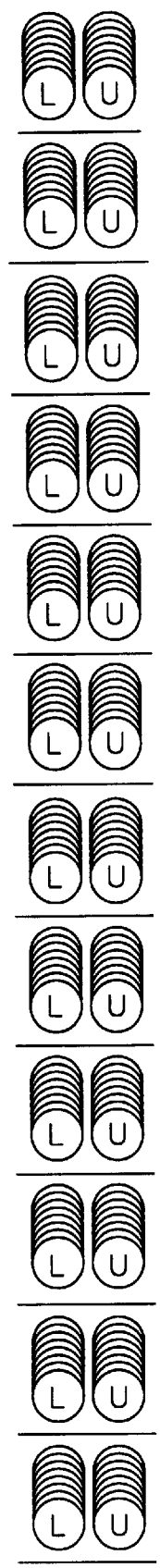

FIG. 20 illustrates one manner of operating the conveyor system 25 to receive a dual, sequential product stream and format the stream to provide a product format wherein each row of product comprises two adjacent products on the proper centers required by, for example, the packaging machine 35. In this formatting operation, the input sections of the upper and lower strip conveyors 50 and 55 remain at fixed positions. The left-most product of each product row of the sequential product stream is supplied to the lower strip conveyor 55 while the right-most product of each row is supplied to the upper strip conveyor 50. The upper and lower strip conveyors 50 and 55 have their respective output carriage assemblies disposed to place the products on the proper centers for the particular product format. Preferably, the left-most input level shifting conveyor section 95 is fixed at its lower position proximate the input of the lower strip conveyor 25 while the right-most input level shifting conveyor section 90 is fixed at its upper position proximate the input of the upper strip conveyor 50. Similarly, the left-most output level shifting conveyor section 545 is fixed at its lower position proximate the output of the lower strip conveyor 55 while the right-most input level shifting conveyor section 540 is fixed at its upper position proximate the output of the upper strip conveyor 50.

As each of the products exit the upper and lower strip conveyors 50 and 55, they are directed to the row staging conveyor 65 by the output level shifting conveyor 60. The stop members respectively corresponding to the lateral positions of the products are activated as each of the products arrive to thereby lift the products from the conveyor bands 580 and align them in a single row.

Once the products are longitudinally aligned in a row by their respective stop members, the stop members are actuated to concurrently release the products as a formatted row for transport to, for example, the first accumulator conveyor 695. As noted above, one or both of the accumulator conveyors 695 and 810 may be used to longitudinally space successive rows of formatted product.

Figure 21:
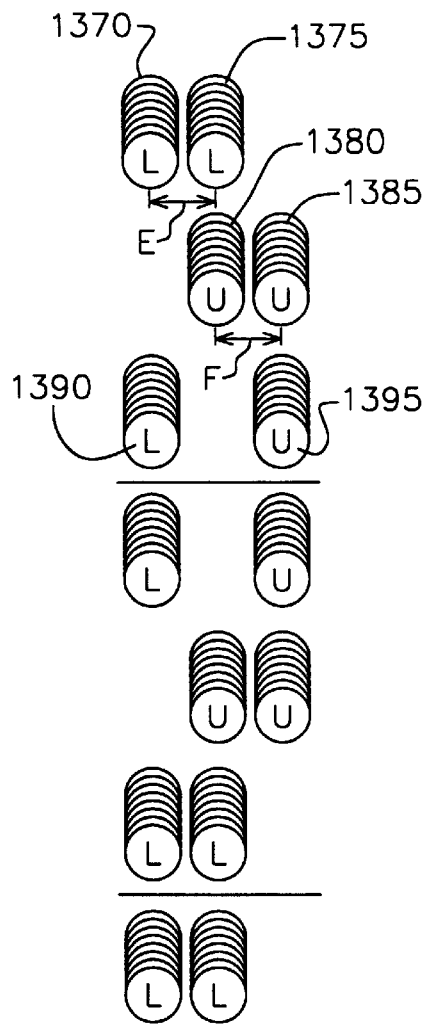

FIG. 21 illustrates one manner of operating the conveyor system 25 to receive a dual, sequential product stream and format the stream to provide a product format wherein each row of product comprises three adjacent products on the proper centers required by, for example, the packaging machine 35. In this formatting operation, the input sections of the upper and lower strip conveyors 50 and 55 remain at fixed positions.

As illustrated, both products 1370 and 1375 of the first row of products received from, for example, the slicing machine 30 are supplied by the input level shifting conveyor 45 to the input of the lower strip conveyor 55. The output carriage assemblies 350 and 355 of the lower strip conveyor 55 are laterally spaced from one another by a predetermined distance E. Both products 1380 and 1385 of the second row of products received from the slicing machine 30 are supplied by the input level shifting conveyor 45 to the input of the upper strip conveyor 50.

Both products 1380 and 1385 of the second row of products received from the slicing machine are supplied by the input level shifting conveyor 45 to the input of the upper strip conveyor 50. The output carriage assemblies 200 and 205 of the upper strip conveyor 50 are laterally spaced from one another by a predetermined distance F. Output carriage assemblies 205 and 350 are preferably arranged to place the products on the same product centers.

The left-most product 1390 of the third row of products received from the slicing machine 30 is supplied to the input of the lower strip conveyor 55 by the left input level shifting conveyor section 95 while the right-most product 1395 of the third row is supplied to the input of the upper strip conveyor 50 by the right input level shifting conveyor section 90.

As each of the products exit the upper and lower strip conveyors 50 and 55, they are directed to the row staging conveyor 65 by the output level shifting conveyor 60. The stop members 80 respectively corresponding to the lateral positions of the products are activated as each of the products arrive to thereby lift the products from the conveyor bands 580 and align them in two rows. Products 1370, 1375, and 1385 are stopped by the stop members so that they are all arranged in a first row while products 1390, 1380, and 1395 are stopped by the stop members so that they are all arranged in a second row. As such, it is preferable to use two rows of stop modules 585 when a two-to-three formatting operation is required.

Once the products are longitudinally aligned in the first and second rows by their respective stop members, the stop members are actuated to concurrently release the products as two formatted rows for transport to, for example, the first accumulator conveyor 695. As noted above, one or both of the accumulator conveyors 695 and 810 may be used to longitudinally space successive rows of formatted product.

Figure 22:
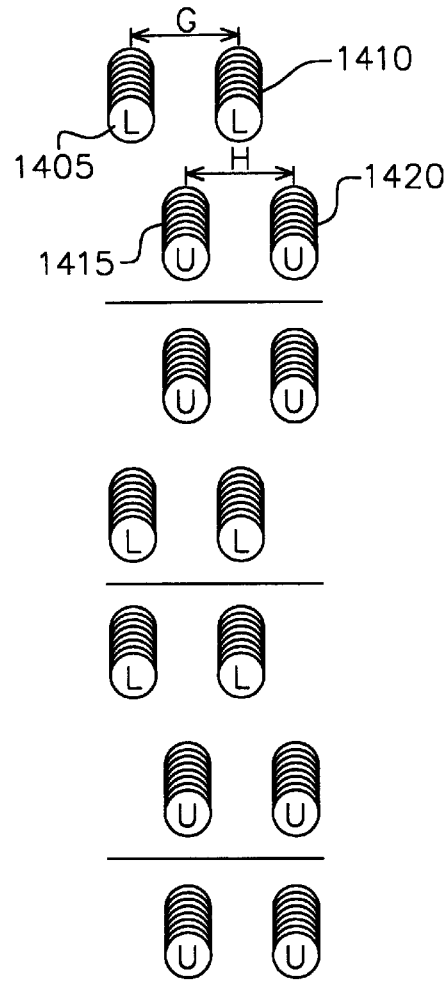

FIG. 22 illustrates one manner of operating the conveyor system 25 to receive a dual, sequential product stream and format the stream to provide a product format wherein each row of product comprises four adjacent products on the proper centers required by, for example, the packaging machine 35. In this formatting operation, the input sections of the upper and lower strip conveyors 50 and 55 preferably remain at fixed positions.

As illustrated, both products 1405 and 1410 of the first row of products received from, for example, the slicing machine 30, are supplied by the input level shifting conveyor 45 to the input of the lower strip conveyor 25. The output carriage assemblies of the lower strip conveyor 55 are laterally spaced from one another by a predetermined distance G. Both products 1415 and 1420 of the second row of products are supplied by the input level shifting conveyor 45 to the input of the upper strip conveyor 50. The output carriage assemblies of the upper strip conveyor 50 are laterally spaced from one another by a predetermined distance H.

As the products exit the upper and lower strip conveyors 50 and 55, they are directed to the row staging conveyor 65 by the output level shifting conveyor 60. The stop members a respectively corresponding to the lateral positions of the products are activated as each of the products arrive to thereby lift the products from the conveyor bands 580 and align them in a single row.

Once the products are longitudinally aligned in the single row by their respective stop members, the stop members are actuated to concurrently release the products as a single formatted row for transport to, for example, the first accumulator conveyor 695. As noted above, one or both of the accumulator conveyors 695 and 810 may be used to longitudinally space successive rows of formatted product.

Control System

Figure 23:
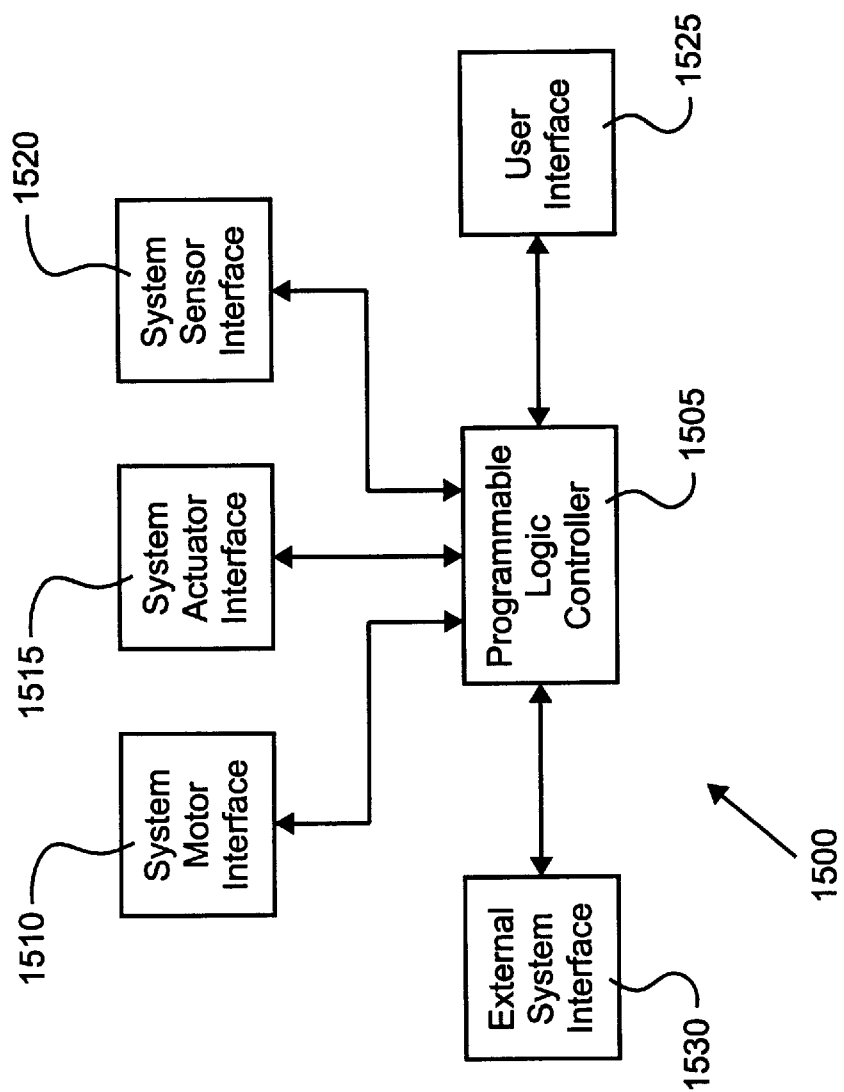
FIG. 23 illustrates one embodiment of a control system architecture suitable for use in controlling the operation of the conveyor system of FIG. 1.

FIG. 23 illustrates one embodiment of a control system architecture 1500 that can be used to operate the conveyor system 25. As shown, a programmable logic controller (PLC) or microcontroller based system 1505 communicates with a plurality of peripheral systems. The peripheral systems of the illustrated embodiment comprise a system motor interface 1510, a system actuator interface 1515, a system sensor interface 1520, a user interface 1525, and an external system interface 1530. The system motor interface 1510 comprises the requisite sensors and drive components that operate the continuous motors and servo motors of the conveyor system. The system sensor interface 1520 comprises the sensors that are used, for example, to determine the position of the products as they are conveyed through the conveyor system.

The actuator interface 1515 comprises the requisite sensors and components that operate, for example, the linear actuators 140 and 570 of the conveyor system. Such actuators include the linear actuators used to operate the input and output level shifting conveyors 45 and 60, as well as the linear actuators used to laterally drive the input sections of the upper and lower strip conveyors 50 and 55. Additionally, the actuator interface 1515 may receive position information from sensors that detect the position of the output carriage assemblies 200, 205, 350 and 355 and direct the assemblies to the appropriate lateral position.

The user interface 1525 comprises the components necessary to allow the user to communicate status information and user initiated control commands to and from the conveyor system. User commands may be initiated through, for example, a keyboard or switch panel. Preferably, such a keyboard or switch panel may be mirrored at opposite ends of the conveyor system. Status information and command prompts may be presented to the user through an alphanumeric display or the like.

The external system interface 1530 comprises the components necessary to communicate with, for example, the slicing machine 30 and/or packaging machine 35. For example, the mode of operation of the slicing machine 30 as well as the speed of its operation may be communicated to the conveyor system to facilitate optimal performance thereof. Information concerning whether a particular product in the product stream supplied from the packaging is on-weight or off-weight can likewise be communicated through the external system interface 1530. Similarly, the indexing state of the packaging machine 35 may be communicated to the PLC 1505 to allow the PLC 1505 to coordinate movement of the output conveyor 850 with both the movement of the prior accumulator conveyor 810 and the indexing movement of the packaging machine 35.

Figure 24:
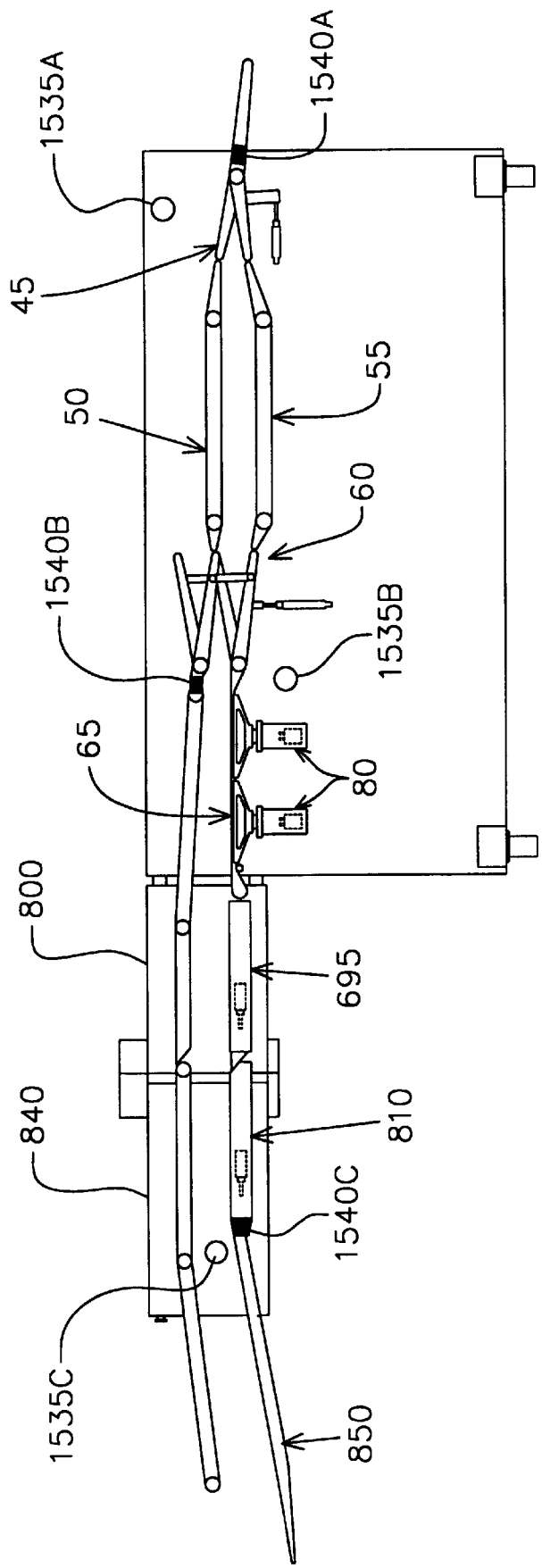
FIGS. 24 and 25 illustrate placement and construction of various sensors that may be used to detect the position of product as the product travels through the conveyor system.

With reference to FIG. 24, the system sensor interface 1520 may comprise a plurality of light bridges 1535 and corresponding reflectors 1540 that are strategically located along the product paths. More particularly, a first light bridge 1535A and corresponding reflector 1540A are disposed to detect product at the input to the input level shifting conveyor 45. The resulting signals may be used to time the operation of the input and output level shifting conveyors 45 and 60 and the lateral movement of one or both of the input sections of the upper and/or lower strip conveyors 50 and 55. A second light bridge 1535B and corresponding reflector 1540B are disposed at the output of the output level shifting conveyor 60. The resulting signals may be used to time the operation of the stop members 80 of the row staging conveyor 65 and/or detect the lateral positions of the product coming from the output carriage assemblies 200, 205, 350, and 355. Signals resulting from the detection of the lateral product positions may be used to direct automatic lateral adjustment of the output carriage assemblies through an appropriate automatic drive, for example, automatic drive 277. Such signals may also be used to coordinate operation of one or both of the accumulator conveyors 65 and 810. A third light bridge 1535C and corresponding set of reflectors 1540C are disposed at the output of the second accumulator conveyor 810. The resulting signals may be used to coordinate operation of the second accumulator conveyor 810 and the output conveyor 850.

Figure 25:
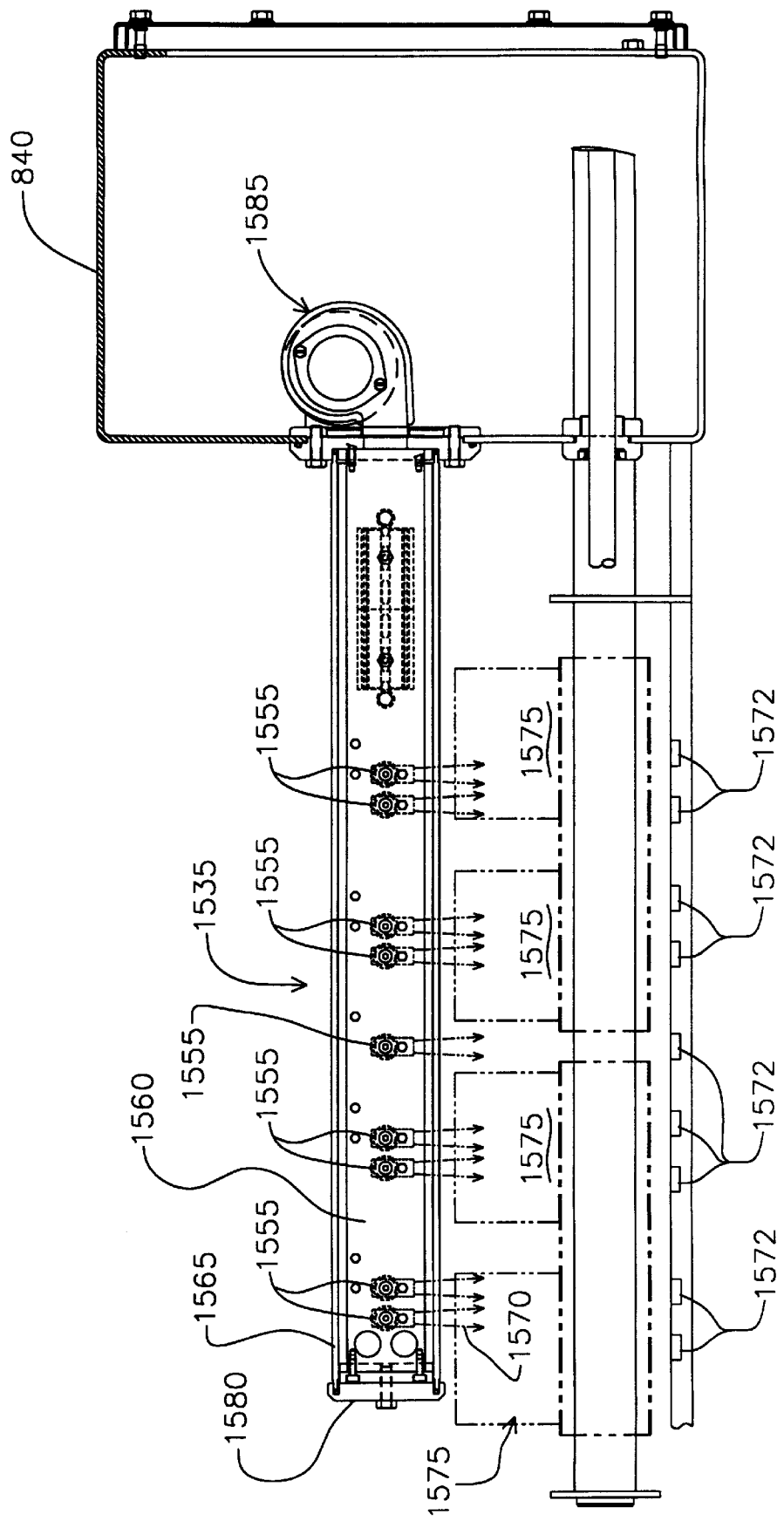

An exemplary embodiment of a light bridge suitable for use in the disclosed conveyor system is shown at 1535 of FIG. 25. The light bridge 1535 comprises a plurality of infrared transceivers 1555 that are supported on a divider 1560 disposed in a hollow, transparent tube 1565. The infrared transceivers 1555 are preferably Polarized Retro transceivers such as those available from Allen-Bradley #42SMU7201. Such transceivers 1555 emit polarized infrared light in the direction of arrows 1570 and receive polarized light from corresponding polarized light reflectors 1572 when there is no product 1575 disposed therebetween. The reflectors 1572 may be polarized reflectors such as those available from Allen-Bradley #92-46. The reflectors 1572 are preferably disposed proximate the interstitial regions between the conveyor bands of the conveyor supporting the product 1575. When the product 1575 moves with the conveyor in the region of the reflectors 1572, the light normally reflected back to the transceivers 1555 is interrupted thereby indicating that product is present in the region.

The hollow, transparent tube 1565 is terminated at a first end thereof by an end cap 1580 and at a second end thereof by an input assembly 1585. A fan or the like may be disposed at the input assembly 1585 to direct a flow of air through the interior of the transparent, hollow tube 1565. Such a flow of air assists in preventing a build-up of condensation which could degrade the performance of the detection system. Preferably, the air flow is directed along one side of the divider 1560 as it enters the tube 1565 and along the opposite side of the divider as it exits the tube 1565. Since the air conducted into the tube 1565 is supplied from the interior of a housing that generally includes moving components that generate heat, the air passing through the tube 1565 is at a temperature that is above the ambient temperature of the room in which the system is disposed. This further assists in removing and/or preventing any unwanted condensation on the tube 1565.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

We claim:

1. A conveyor system for accepting one or more streams of product input and converting said one or more streams to a format that is suitable for automatic loading to a subsequent machine, the conveyor system comprising:

an input level shifting conveyor disposed to receive the one or more product input streams, the level shifting conveyor being movable between a first upper level position and second lower level position;

an upper level strip conveyor disposed to receive product from the input level shifting conveyor when the input level shifting conveyor is moved to the first upper level position, the upper level strip conveyor including an output end in a fixed position to direct product received by the upper level strip conveyor to a first lateral alignment position of the format;

a lower level strip conveyor disposed to receive product from the level shifting conveyor when the level shifting conveyor is moved to the second lower level position, the lower level strip conveyor including an output end in a fixed position to direct product received by the lower level strip conveyor to a second lateral alignment position of the format, the second lateral alignment position being different from the first lateral alignment position;

an output level shifting conveyor that is movable between a first upper level position at which the output level shifting conveyor is disposed to receive product from the upper level strip conveyor and a second lower level at which the output level shifting conveyor is disposed to receive product from the lower level strip conveyor.

2. A conveyor system as claimed in claim 1 wherein the input level shifting conveyor comprises at least two adjacent hinged conveyors pivotable about a common axis and independently operable to direct product to the upper and lower level strip conveyors.

3. A conveyor system as claimed in claim 2 wherein the upper level strip conveyor comprises at least two output ends disposed laterally from one another and respectively associated with each of the at least two hinged conveyors.

4. A conveyor system as claimed in claim 2 wherein the lower level strip conveyor comprises at least two output ends disposed laterally from one another and respectively associated with each of the at least two hinged conveyors.

5. A conveyor system as claimed in claim 3 wherein the output level shifting conveyor comprises a plurality of hinged conveyors, each hinged conveyor respectively associated with each of the at least two output ends of the upper level strip conveyor.

6. A conveyor system as claimed in claim 4 wherein the output level shifting conveyor comprises a plurality of hinged conveyors, each hinged conveyor respectively associated with each of the at least two output ends of the lower level strip conveyor.

7. A conveyor system for accepting one or more streams of product input and converting said one or more streams to a format that is suitable for automatic loading to a subsequent machine, the conveyor system comprising:

first and second level shifting conveyors disposed to receive the one or more product input streams, each of the first and second level shifting conveyors being independently movable between a first upper level position and second lower level position;

first and second upper level strip conveyors disposed to receive product from one or both of the first and second level shifting conveyors when one or both of the level shifting conveyors are moved to the first upper level position;

first and second lower level strip conveyors disposed to receive product from one or both of the first and second level shifting conveyors when one or both level shifting conveyors are moved to the second lower level position;

third and fourth level shifting conveyors, each of the third and fourth level shifting conveyors being independently movable between a first upper level position at which one or both of the third and fourth level shifting conveyors are disposed to receive product from the first and second upper level strip conveyors and a second lower level at which one or both of the third and fourth level shifting conveyors are disposed to receive product from the first and second lower level strip conveyors.

8. A conveyor system as claimed in claim 7 wherein each of the first and second level shifting conveyors comprises a hinged input end and a pivoting output end.

9. A conveyor system as claimed in claim 7 wherein each of the third and fourth level shifting conveyors comprises a hinged output end and a pivoting input end.

10. A conveyor system as claimed in claim 7 wherein the first and second upper level strip conveyors comprise:

a common input end common to both of the first and second upper level strip conveyors;

a lateral drive disposed to drive the common input end in a lateral direction during formatting of the product.

11. A conveyor system as claimed in claim 10 wherein the first and second upper level strip conveyors comprise:

a first output portion terminating the output of first upper level strip conveyor;

a second output portion terminating the output of second upper level strip conveyor;

a lateral adjustment assembly for laterally adjusting the first and second output portions to ensure proper lateral spacing of the product format.

12. A conveyor system as claimed in claim 7 wherein the first and second upper level strip conveyors comprise:

a first output portion terminating the output of first upper level strip conveyor;

a second output portion terminating the output of second upper level strip conveyor;

a lateral adjustment assembly for laterally adjusting the first and second output portions to ensure proper lateral spacing of the product format.

13. A conveyor system as claimed in claim 12 wherein the first and second lower level strip conveyors comprise:

a common input end common to both of the first and second lower level strip conveyors;

a lateral drive disposed to drive the common input end in a lateral direction during formatting of the product.

14. A conveyor system as claimed in claim 13 wherein the first and second upper level strip conveyors comprise:

a first output portion terminating the output of first upper level strip conveyor;

a second output portion terminating the output of second upper level strip conveyor;

a lateral adjustment assembly for laterally adjusting the first and second output portions to ensure proper lateral spacing of the product format.

15. A conveyor system as claimed in claim 7 wherein the first and second upper level strip conveyors comprise:

a first output portion terminating the output of first lower level strip conveyor;

a second output portion terminating the output of second lower level strip conveyor;

a lateral adjustment assembly for laterally adjusting the first and second output portions to ensure proper lateral spacing of the product format.

16. A conveyor system as claimed in claim 7 and further comprising a row staging conveyor receiving product from the third and fourth level shifting conveyors to longitudinally align the received product in at least one row.

17. A conveyor system as claimed in claim 16 wherein the row staging conveyor comprises:

a first roller axis disposed at an input end of the row staging conveyor;

a second roller axis disposed at an output end of the row staging conveyor;

a plurality of conveying elements disposed to rotate about the first and second roller axes;

a plurality of individually actuatable stop members disposed to extend through interstitial regions between the plurality of conveying elements when activated to thereby stop product thereon.

18. A conveyor system as claimed in claim 17 wherein the plurality of individually actuatable stop members are disposed in at least one removable module, the at least one removable module comprising:

a housing in which the individually actuatable stop members are disposed;

a plurality of connectors disposed in fixed alignment with the housing and facilitating conduction of actuating signals to the individually actuatable stop members, the plurality of connectors being positioned to engaged a corresponding further plurality of connectors in fixed alignment with the row staging conveyor.

19. A conveyor system as claimed in claim 16 and further comprising an accumulator conveyor disposed to receive product from the row staging conveyor.

20. A conveyor system as claimed in claim 19 wherein the accumulator conveyor is driven by a servo-motor.

21. A conveyor system as claimed in claim 7 and further comprising an off-weight product conveying system for conveying off-weight product, the off-weight product conveying system being operable to prevent the off-weight product from reaching the first and second level shifting conveyors.

22. A conveyor system as claimed in claim 21 wherein the off-weight conveying system conveys off-weight product along a path that is laterally adjacent a path taken by on-weight product through the conveyor system.

23. A conveyor system as claimed in claim 21 and further comprising an off-weight product conveying system for conveying off-weight product, the off-weight product conveying system being operable to receive the off-weight product from the upper level strip conveyors and to prevent the off-weight product from reaching the row staging conveyor.

24. A conveyor system as claimed in claim 23 wherein the off-weight conveying system conveys off-weight product along a path that is overhead a path taken by on-weight product through the conveyor system.

25. A conveyor system for accepting one or more streams of product input and converting said one or more streams to a format that is suitable for automatic loading to a subsequent machine, the conveyor system comprising:

level shifting conveyor means disposed to receive the one or more product input streams, the level shifting conveyor means being operable to independently move the one or more product input streams between a first upper level position and a second lower level position;

upper level strip conveyor means disposed to receive product from the level shifting conveyor means when the level shifting conveyor means moves product from the one or more streams of product input to the first upper level position;

lower level strip conveyor means disposed to receive product from the level shifting conveyor means when the level shifting conveyor means moves product from the one or more streams of product input to the second lower level position;

second level shifting conveyor means operable to independently move product from the upper and lower level strip conveyor means to a further conveyor level.

26. A conveyor system as claimed in claim 25 wherein the first level shifting conveyor means comprises first and second level shifting conveyors disposed to receive the one or more product input streams, each of the first and second level shifting conveyors being independently movable between a first upper level position and second lower level position.

27. A conveyor system as claimed in claim 25 wherein one or both of the upper and lower level strip conveyor means comprises first and second upper level strip conveyors disposed to receive product from the level shifting conveyor means.

28. A conveyor system as claimed in claim 25 wherein the second level shifting conveyor means comprises first and second level shifting conveyors, each of the first and second level shifting conveyors being independently movable between a first upper level position at which one or both of the first and second level shifting conveyors are disposed to receive product from the upper level strip conveyor means and a second lower level position at which one or both of the first and second level shifting conveyors are disposed to receive product from the lower level strip conveyor means.

29. A conveyor system as claimed in claim 25 and further comprising lateral drive means for laterally moving an input end of the upper level strip conveyor means during product formatting.

30. A conveyor system as claimed in claim 25 and further comprising lateral drive means for laterally moving an input end of the lower level strip conveyor means during product formatting.

31. A conveyor system as claimed in claim 25 and further comprising lateral adjustment means for laterally adjusting an output end of the upper level conveyor means during product formatting.

32. A conveyor system as claimed in claim 25 and further comprising lateral adjustment means for laterally adjusting an output end of the lower level conveyor means during product formatting.

33. A conveyor system as claimed in claim 25 and further comprising a row staging conveyor means for aligning product received from the second level shifting conveyor means into one or more rows.

34. A conveyor system as claimed in claimed 33 wherein the row staging conveyor means comprises:

a housing;

a plurality of stopping means disposed in the housing;

connecting means in fixed alignment with the housing for conducting actuating signals to the plurality of stopping means.

35. A conveyor system as claimed in claim 33 and further comprising a servo-motor driven accumulator conveyor disposed to receive product from the row staging conveyor means.

36. A conveyor system for accepting one or more streams of product input and converting said one or more streams to a format that is suitable for automatic loading to a subsequent machine, the conveyor system comprising:

first and second level shifting conveyors disposed to receive the one or more product input streams, each of the first and second level shifting conveyors being independently movable between a first upper level position and second lower level position;

an upper level strip conveyor disposed to receive product from one or both of the first and second level shifting conveyors when one or both of the level shifting conveyors are moved to the first upper level position;

a lower level strip conveyor disposed to receive product from one or both of the first and second level shifting conveyors when one or both level shifting conveyors are moved to the second lower level position;

third and fourth level shifting conveyors, each of the third and fourth level shifting conveyors being independently movable between a first upper level position at which one or both of the third and fourth level shifting conveyors are disposed to receive product from the upper level strip conveyor and a second lower level at which one or both of the third and fourth level shifting conveyors are disposed to receive product from the lower level strip conveyors.

\* \* \* \* \*